United States Patent
Jeong et al.

(10) Patent No.: US 9,581,746 B1
(45) Date of Patent: Feb. 28, 2017

(54) METHOD OF MANUFACTURING WIRE GRID POLARIZER

(71) Applicant: KOREA INSTITUTE OF MACHINERY & MATERIALS, Daejeon (KR)

(72) Inventors: Jun-Ho Jeong, Daejeon (KR); Junhyuk Choi, Daejeon (KR); Dae-Guen Choi, Daejeon (KR); So Hee Jeon, Daejeon (KR); Ji Hye Lee, Daejeon (KR); Joo Yun Jung, Daejeon (KR); Soon-Hyoung Hwang, Daejeon (KR); Sang Keun Sung, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 14/958,989

(22) Filed: Dec. 4, 2015

(30) Foreign Application Priority Data

Sep. 16, 2015 (KR) .................. 10-2015-0131007

(51) Int. Cl.
G02B 5/30 (2006.01)
(52) U.S. Cl.
CPC ................. G02B 5/3058 (2013.01)
(58) Field of Classification Search
None
See application file for complete search history.

(56) References Cited

U.S. PATENT DOCUMENTS

| 7,561,332 B2* | 7/2009 | Little | G02B 5/3058 349/1 |
| 7,955,545 B2* | 6/2011 | Lee | B29C 59/022 264/293 |
| 8,177,991 B2* | 5/2012 | Lussem | B82Y 10/00 156/230 |
| 8,894,871 B2* | 11/2014 | Shin | G03F 7/0035 216/72 |
| 2001/0035821 A1* | 11/2001 | Ruhrig | G08B 13/2408 340/572.6 |
| 2003/0175154 A1* | 9/2003 | Hsu | B82Y 10/00 438/99 |
| 2003/0175427 A1* | 9/2003 | Loo | B82Y 10/00 427/256 |
| 2005/0250276 A1* | 11/2005 | Heath | B82Y 10/00 438/200 |
| 2006/0113279 A1 | 6/2006 | Little et al. | |
| 2006/0118514 A1 | 6/2006 | Little et al. | |

(Continued)

FOREIGN PATENT DOCUMENTS

JP 04-296382 10/1992
JP 2006-84776 3/2006
(Continued)

*Primary Examiner* — Allan Olsen
(74) *Attorney, Agent, or Firm* — Lex IP Meister, PLLC

(57) ABSTRACT

A method of manufacturing a wire grid polarizer includes: preparing a stamp having a nanostructure body at one surface and forming a mask layer with anisotropic vapor deposition at the one surface; forming a metal film on a substrate; transferring a mask layer of an upper portion of a nanostructure body in the mask layer onto the metal film; and patterning the metal film into metal lines by removing a portion that is not covered with the mask layer in the metal film with dry etching.

14 Claims, 41 Drawing Sheets

(56) References Cited

U.S. PATENT DOCUMENTS

| | | | |
|---|---|---|---|
| 2006/0267029 A1* | 11/2006 | Li | H01L 33/22 257/79 |
| 2007/0183035 A1* | 8/2007 | Asakawa | B82Y 20/00 359/485.05 |
| 2008/0041816 A1 | 2/2008 | Choo | |
| 2008/0241491 A1* | 10/2008 | Wessels | B82Y 10/00 428/209 |
| 2009/0219617 A1* | 9/2009 | Asakawa | G02B 5/3075 359/485.05 |
| 2010/0080914 A1* | 4/2010 | Forrest | H01L 51/0021 427/259 |
| 2013/0167355 A1* | 7/2013 | Lutz | B44C 1/1729 29/428 |
| 2013/0270223 A1 | 10/2013 | Lee | |
| 2015/0064628 A1* | 3/2015 | Guo | G03F 7/30 430/316 |

FOREIGN PATENT DOCUMENTS

| | | |
|---|---|---|
| JP | 2008-46580 | 2/2008 |
| JP | 2008-90238 | 4/2008 |
| JP | 2008-522226 | 6/2008 |
| JP | 2008-299178 | 12/2008 |
| JP | 2009-105252 | 5/2009 |
| JP | 2009-145742 | 7/2009 |
| JP | 2012-108352 | 6/2012 |
| JP | 2015-79100 | 4/2015 |
| KR | 10-2005-0038243 | 4/2005 |
| KR | 10-2010-0074434 | 7/2010 |
| KR | 10-2013-0116978 | 10/2013 |
| KR | 10-2013-0126391 | 11/2013 |

* cited by examiner

METHOD OF MANUFACTURING WIRE GRID POLARIZER

CROSS-REFERENCE TO RELATED APPLICATION

This application claims priority to and the benefit of Korean Patent Application No. 10-2015-0131007 filed in the Korean Intellectual Property Office on Sep. 16, 2015, the entire contents of which are incorporated herein by reference.

BACKGROUND OF THE INVENTION (a) Field of the Invention

The present invention relates to a wire grid polarizer. More particularly, the present invention relates to a method of manufacturing a wire grid polarizer that can be produced in a large area and that can perform a continuous process using a roll stamp.

(b) Description of the Related Art

A wire grid polarizer is formed with a substrate and metal lines having a high aspect ratio and that are formed on the substrate. The metal lines are separated and are arranged in parallel. When an arrangement cycle (pitch) of the metal lines is fully smaller than a wavelength of incident light, in the incident light, a polarizing component parallel to the metal lines is reflected, and a polarizing component perpendicular to the metal lines is transmitted. The wire grid polarizer converts incident light to straight polarized light using such a phenomenon.

In the wire grid polarizer, a pitch of the metal lines is approximately 40 nm to 200 nm, a width of each metal line is approximately 20 nm to 100 nm, and a height of each metal line is approximately 20 nm to 200 nm. The metal lines are made of a metal such as aluminum, tungsten, or titanium.

As a conventional method of manufacturing a wire grid polarizer, several technologies such as an exposure technology and a nanoimprint technology are well known. However, the exposure technology has a limitation in an expensive apparatus or reduction of a width of a metal line, and nanoimprint technology can perform micropatterning of tens of nanometers, but has difficulty in mass production.

FIG. 16 is a schematic diagram illustrating a conventional method of manufacturing a wire grid polarizer using nanoimprint technology.

Referring to FIG. 16, nanoimprint technology includes a process of forming a mask layer 345 that is made of an organic material or an organic-inorganic complex material on a metal film 310, pressing and hardening the mask layer 345 with a stamp 330 in which a nanostructure body 320 is formed, patterning the mask layer 345 into an etching mask 340, dry etching the metal film 310, and patterning the metal film 310 into metal lines 315.

In such nanoimprint technology, it is difficult to control a remaining layer in a large area process and a continuous process using a roll stamp in view of a characteristic of a pressing process.

For example, as a substrate 350 is formed in a large size, a remaining layer (a portion that is not patterned but remains) 346 may occur in the etching mask 340 by surface non-uniformity (flatness deterioration) of the substrate 350, and the remaining layer 346 causes a pattern failure of the metal lines 315. Further, because the etching mask 340 that is made of an organic material is easily damaged in a process of ion etching the metal film 310, there is a limitation in enhancing an aspect ratio of the metal line 315.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of manufacturing a wire grid polarizer having advantages of being capable of accurately patterning metal lines having an excellent film characteristic in a high aspect ratio, producing them in a large area, and performing a continuous process using a flexible stamp.

An exemplary embodiment of the present invention provides a method of manufacturing a wire grid polarizer including: preparing a stamp having a nanostructure body at one surface and forming a mask layer with anisotropic vapor deposition at the one surface; forming a metal film on a substrate; transferring the mask layer onto the metal film; and patterning the metal film into metal lines by removing a portion that is not covered with the mask layer in the metal film with dry etching.

The nanostructure body may include a plurality of protruding portions, the forming of a mask layer with anisotropic vapor deposition may include forming a mask layer at an upper surface of the plurality of protruding portions by performing anisotropic vapor deposition in a direction parallel to a thickness direction of the stamp, and the transferring of the mask layer onto the metal film may include transferring the mask layer that is formed at an upper surface of the plurality of protruding portions onto the metal film.

The forming of a mask layer with anisotropic vapor deposition may include forming a mask layer at an upper surface and one side surface of each of the plurality of protruding portions by performing anisotropic vapor deposition in a direction that is inclined in a thickness direction of the stamp, and the mask layer that is transferred onto the metal film may have a constant thickness of a flat portion and a protrusion that contacts one side edge of the flat portion.

The mask layer may be angularly deposited in two different directions to be formed at an upper surface and both side surfaces of each of the plurality of protruding portions, and the mask layer that is transferred onto the metal film may further include a protrusion that contacts the other side edge of the flat portion.

The mask layer that is transferred onto the metal film may be exposed to an etching gas to be etched until the flat portion is entirely removed, and a portion of the protrusion may remain to constitute a final mask layer.

The mask layer may include an inorganic material or a metal of a different kind from that of the metal film, and an etching ratio of the mask layer against the metal film to an etching gas of the metal film may be 1 or less.

The mask layer may be formed with a single film of any one of a silicon oxide, a silicon nitride, a polysilicon, an aluminum oxide, aluminum, copper, gold, tungsten, titanium, and titanium-tungsten, or a stacked layer thereof.

An adhesive layer including a bond primer may be formed on the metal film, and the mask layer may be transferred onto the adhesive layer.

A hard mask layer including a metal of a different kind from that of the metal film may be formed on the metal film, and an etching ratio of the hard mask layer against the metal film to an etching gas of the metal film may be 1 or less.

The mask layer may include an inorganic material or a metal of a different kind from that of the hard mask layer, and an etching ratio of the mask layer against the hard mask layer to an etching gas of the hard mask layer may be 1 or less.

The mask layer may be transferred onto the hard mask layer. The patterning of the metal film with metal lines may include a first process of dry etching the hard mask layer using a first etching gas, and a second process of dry etching the metal film using a second etching gas.

In the second process, the entirety of the mask layer and a portion of the hard mask layer may be removed by etching.

An adhesive layer including a bond primer may be formed on the hard mask layer, and the mask layer may be transferred onto the adhesive layer.

The mask layer may be formed in a multilayer structure having at least one mask material layer and at least two function layers, and the function layer may include a mold release layer that contacts a surface of the stamp and a bond reinforcing layer that is formed on the mask material layer. The mold release layer may include a metal, and the mask material layer may include an inorganic material or a metal of a different kind from that of the mold release layer and the metal film. The bond reinforcing layer may include a metal of the same kind as that of the metal film.

The mask material layer may be separated into at least two layers, and the function layer may be formed in each layer between the at least two separated layers to include at least one flexible layer that enhances flexibility of the entire mask layer.

The stamp may be made of a flexible material, the mask layer may be aligned on the substrate toward the substrate, and the mask layer may be pressed by a roller to be separated from the substrate.

According to a method of manufacturing a wire grid polarizer by the present invention, a stamp can be formed in a large size or transfer of a mask layer can be performed in a continuous process using a combination of a flexible stamp and a roller, and thus a wire grid polarizer can be easily produced in mass production. Further, because a metal film having an excellent film characteristic can be accurately patterned with a high aspect ratio of 1 or more, a high quality wire grid polarizer can be produced.

DETAILED DESCRIPTION OF THE EMBODIMENTS

Figure 1:
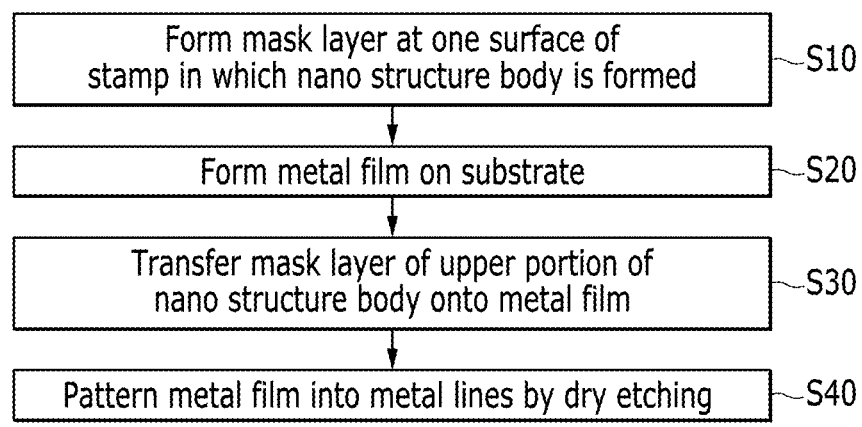
FIG. 1 is a process flowchart illustrating a method of manufacturing a wire grid polarizer according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the entire specification, when it is said that any part, such as a layer, film, region, or plate is positioned on another part, it means the part is directly on the other part or above the other part with at least one intermediate part. Further, in the specification, an upper part of a target portion indicates an upper part or a lower part of a target portion, as it does not mean that the target portion is always positioned at the upper side based on a gravity direction.

In addition, in the specification, unless explicitly described to the contrary, the word "comprise" and variations such as "comprises" or "comprising" will be understood to imply the inclusion of stated elements but not the exclusion of any other elements. Further, in the drawings, a size and thickness of each element are randomly represented for better understanding and ease of description, and the present invention is not limited thereto.

FIG. 1 is a process flowchart illustrating a method of manufacturing a wire grid polarizer according to a first exemplary embodiment of the present invention.

Referring to FIG. 1, a method of manufacturing a wire grid polarizer includes a first step (S10) of preparing a stamp having a nanostructure body at one surface and forming a mask layer with anisotropic vapor deposition at one surface of the stamp, a second step (S20) of forming a metal film on a substrate, a third step (S30) of transferring a mask layer of an upper portion of the nanostructure body onto a metal film, and a fourth step (S40) of patterning a portion that is not covered with the mask layer in the metal film into metal lines by dry etching.

FIGS. 2A to 2D are cross-sectional views illustrating a manufacturing process of a wire grid polarizer according to a first exemplary embodiment of the present invention.

Figure 2A:
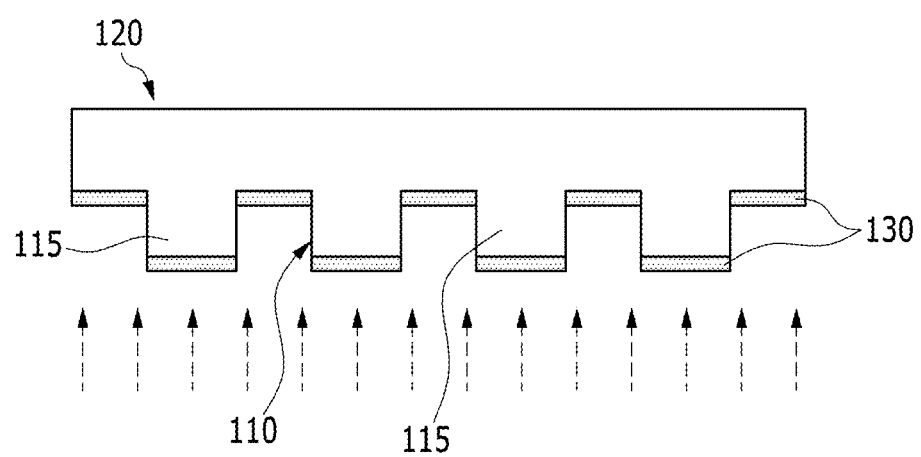
FIGS. 2A to 2D are cross-sectional views illustrating a manufacturing process of a wire grid polarizer according to a first exemplary embodiment of the present invention.

Referring to FIG. 2A, in the first step (S10), at one surface, a stamp (or mold) 120 having a nanostructure body 110 is prepared, and a mask layer 130 is formed with anisotropic vapor deposition at one surface of the stamp 120.

The stamp 120 is made of various materials such as a polymer, glass, and silicon, and one surface thereof is processed with a patterning technology such as electron beam, exposure, and nanoimprint technologies to form the nanostructure body 110. Alternatively, the stamp 120 may be produced with a method of copying a master that is processed with patterning technology such as electron beam, exposure, and nanoimprint technologies. In order to enhance a mold release property of the mask layer 130, at one surface of the stamp 120, a self-assembled monomolecular film or a nanoscale thickness film of an organosilica compound such as tridecafluoro-1,1,2,2-tetrahydrooctyltrichlorosilane (FOTS) may be formed by a solution process or a deposition process.

The nanostructure body 110 is formed with protruding portions 115 of a wire grid shape. The protruding portions 115 have the same height and the same width, are separated by a constant distance, and are arranged in parallel.

A width of the protruding portion 115 may be the same as or smaller than that of a metal line of a wire grid polarizer to be produced, and a gap between the protruding portions 115 may be the same as or larger than that between metal lines to be produced. For example, a width of the protruding portion 115 may be approximately 20 nm to 100 nm, and a pitch (arrangement cycle) of the protruding portions 115 may be approximately 40 nm to 200 nm.

The stamp 120 is injected into vapor deposition equipment, and at one surface of the stamp 120 in which the nanostructure body 110 is formed, the mask layer 130 is formed with anisotropic vapor deposition. Anisotropic vapor deposition is deposition technology in which a deposition direction is controlled in one specific direction, and in a first exemplary embodiment, a deposition direction (indicated by a dotted line arrow) of the mask layer 130 corresponds with a thickness direction (vertical direction of FIG. 2A) of the stamp 120. Therefore, the mask layer 130 is deposited with a constant thickness at an upper surface of the protruding portion 115 and a concave surface between the protruding portions 115.

The mask layer 130 functions as an etching mask for patterning of a metal film at the fourth step (S40). Therefore, the mask layer 130 is made of different materials from that of the metal film of the second step (S20), and is made of a material having lower reactivity than that of an etching gas that etches a metal film at the fourth step (S40). Here, low reactivity means that an etching ratio of the mask layer 130 against the metal film to the etching gas of the metal film is 1 or less.

Further, the mask layer 130 is made of a material in which anisotropic vacuum application is available, and is preferably made of an inorganic material or a metal. For example, the mask layer 130 may be formed with a single film of any one of a silicon oxide, a silicon nitride, a polysilicon, an aluminum oxide, aluminum, copper, gold, tungsten, titanium, and titanium-tungsten, or a stacked layer thereof.

When the metal film of the second step (S20) is aluminum, the mask layer 130 is made of a metal or an inorganic material satisfying the foregoing etching ratio for an etching gas of aluminum, and may be made of, for example, a silicon oxide.

Figure 2B:
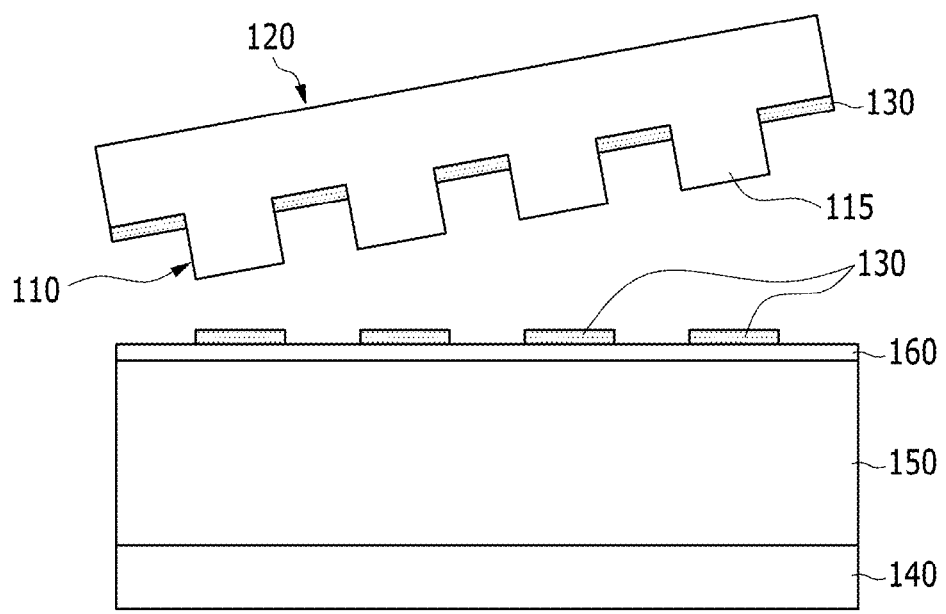

Referring to FIG. 2B, in the second step (S20), a metal film 150 is formed on a substrate 140, and in the mask layer 130 of the stamp 120, the mask layer 130 of an upper portion of the nanostructure body 110 is transferred onto the metal film 150 in the third step (S30).

The substrate 140 may be made of various materials such as glass, crystal, and a polymer. The metal film 150 may include various metals such as aluminum, tungsten, titanium, or titanium-tungsten, and at a front surface of the substrate 140, the metal film 150 may be formed with chemical vapor deposition (CVD). The metal film 150 that is formed with CVD has a much better film characteristic than that of a metal film that is formed with physical vapor deposition (PVD).

In the second step (S20), an adhesive layer 160 may be formed on the metal film 150. The adhesive layer 160 may be formed with a bond primer such as n-(3-(trimethoxysilyl)propyl)ethylenediamine, and performs a function of enhancing adherence of the mask layer 130 to the metal film 150 in the third step (S30). The adhesive layer 160 may be omitted, as needed.

In the third step (S30), the stamp 120 is aligned on the substrate 140 so that one surface thereof that is deposited while the mask layer 130 faces the substrate 140 and the stamp 120 descends toward the substrate 140 and rises upward. The mask layer 130 of an upper portion of the nanostructure body 110 closely contacts the adhesive layer 160 by descent of the stamp 120, and is separated from the rising stamp 120 to be transferred onto the adhesive layer 160.

In this case, a uniform pressure is applied to the entire descended stamp 120 to enable the mask layer 130 to contact an upper portion of the substrate 140 well, and in order to reinforce a bond property of the adhesive layer 160, additional pressure or heat may be applied or ultraviolet rays may be radiated. A width of the transferred mask layer 130 may be the same as or larger than that of the protruding portion 115 of the stamp 120, and a gap between the mask layers 130 may be the same as or smaller than that between the protruding portions 115.

Figure 2C:
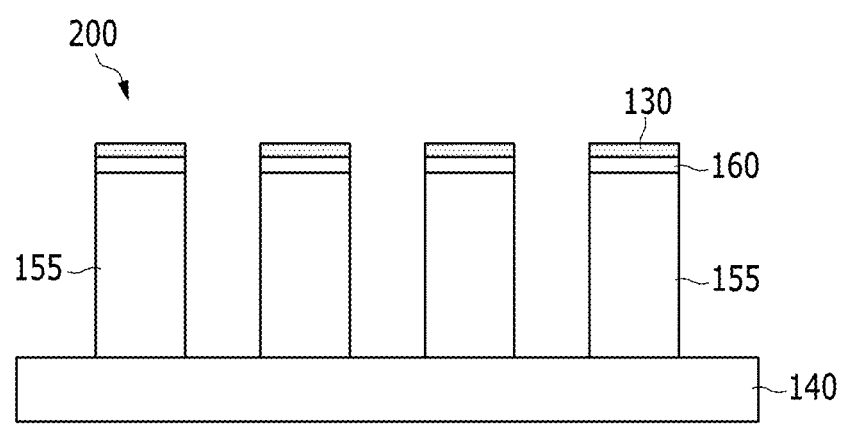

Referring to FIG. 2C, in the fourth step (S40), the metal film 150 is patterned into metal lines 155 by dry etching. Specifically, the substrate 140 in which the mask layer 130 is transferred is injected into dry etching equipment, and in the metal film 150, a portion that is not covered with the mask layer 130 is removed by an etching gas. Because dry etching is anisotropic etching in which etching is performed in one direction, unlike wet etching, upon dry etching, the metal film 150 may be etched with a high aspect ratio.

Further, because the mask layer 130 is made of a hard inorganic material or metal instead of an organic material such as a polymer resin, in a process of ion etching the metal film 150, the mask layer 130 is less physically damaged by an etching gas. Therefore, the metal lines 155 may be accurately patterned, and the completed metal lines 155 may have a high aspect ratio of 1 or more.

A mask layer that is made of an organic material such as a polymer resin is easily damaged in an ion etching process. When the mask layer is damaged, an unintended portion of the metal film is exposed by an etching gas and thus metal lines cannot be accurately patterned into an intended shape. Further, metal lines may not be formed with a high aspect ratio.

A completed wire grid polarizer 200 includes a substrate 140 and metal lines 155 that are formed on the substrate 140, and each of the metal lines 155 may have a high aspect ratio of 1 or more. The adhesive layer 160 and the mask layer 130 are not removed but remain on the metal lines 155 to constitute the wire grid polarizer 200.

Figure 2D:
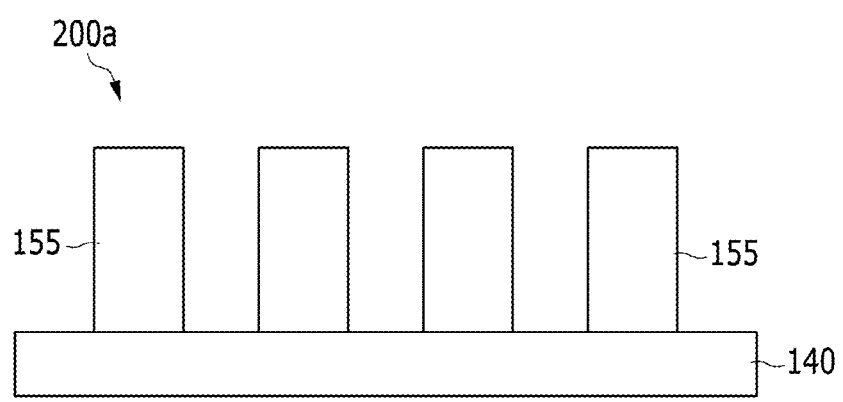

Alternatively, the mask layer 130 and the adhesive layer 160 are removed and thus only the metal lines 155 may remain on the substrate 140. A wire grid polarizer 200a of FIG. 2D is formed with the substrate 140 and the metal lines 155.

A manufacturing method of the foregoing first exemplary embodiment has a characteristic that it forms the mask layer 130 including an inorganic material or a metal in the stamp 120 with anisotropic vapor deposition, transfers the mask layer 130 onto the metal film 150, and dry etches the metal film 150 using the transferred mask layer 130.

Figure 16:
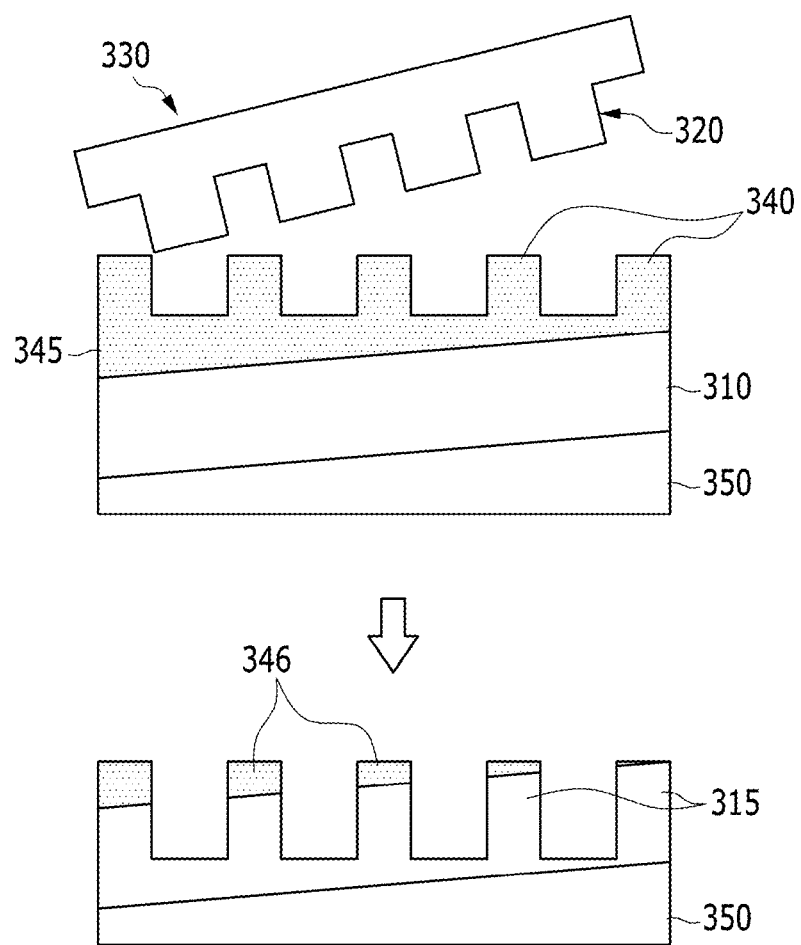
FIG. 16 is a schematic diagram illustrating a conventional method of manufacturing a wire grid polarizer using nanoimprint technology.

Compared with the conventional nanoimprint technology that is described with reference to FIG. 16, in a mask layer of a first exemplary embodiment, a remaining layer, which is a portion that is not patterned but that remains, does not exist. Specifically, because the mask layer 130 of the first exemplary embodiment is not deformed by pressing, even if the substrate 140 and the stamp 120 are formed with a large size, a remaining layer does not occur and thus a pattern failure of the metal lines 155 by the remaining layer can be prevented.

As the substrate 140 is formed with a large size, transfer quality of the mask layer 130 may be somewhat deteriorated by surface non-uniformity (flatness deterioration) of the substrate 140, but when the stamp 120 is made of a flexible material such as a polymer film, such a problem can be solved. That is, because the stamp 120 that is made of a flexible material is easily deformed along the surface of the metal film 150 by an external pressure, transfer quality of the mask layer 130 can be enhanced.

According to a manufacturing method of a first exemplary embodiment, by forming the stamp 120 with a large size or by producing the stamp 120 as a roll stamp, transfer of the mask layer 130 can be performed in a continuous process, thereby easily producing the wire grid polarizer 200 in mass production. Further, because the metal film 150 having an excellent film characteristic can be accurately patterned with a high aspect ratio of 1 or more, the wire grid polarizer 200 of a high quality can be produced.

Figure 3A:
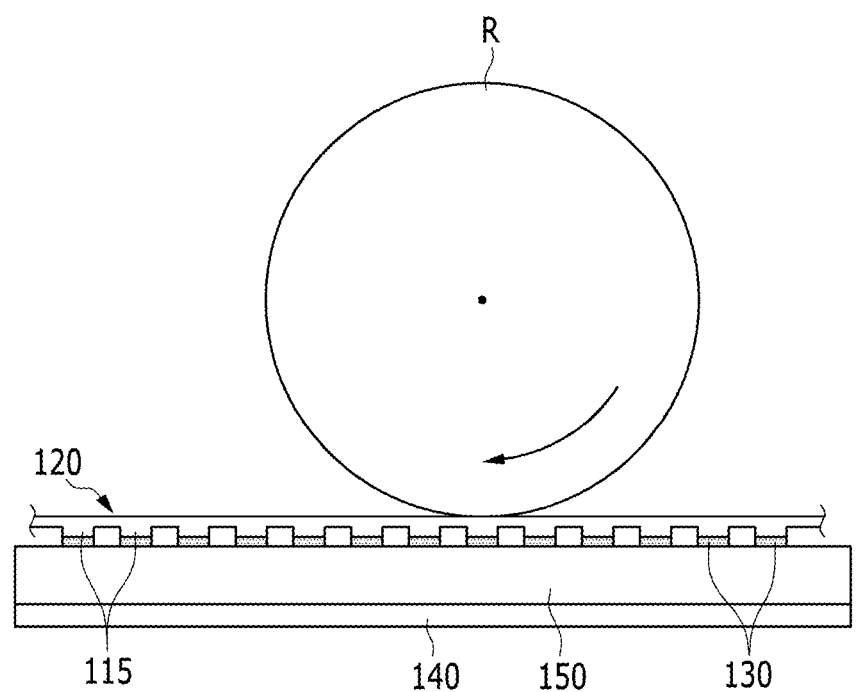
FIGS. 3A and 3B are cross-sectional views illustrating a first exemplary variation of a third step in the process flowchart of FIG. 1.
Figure 3B:
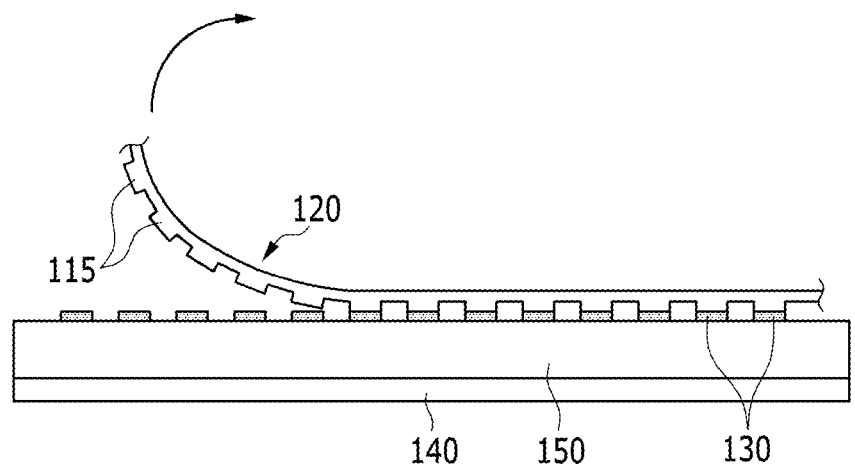

FIGS. 3A and 3B are cross-sectional views illustrating a first exemplary variation of a third step in the process flowchart of FIG. 1.

Referring to FIGS. 3A and 3B, a stamp 120 is made of a flexible material such as a polymer film, and a nanostructure body 110 and the mask layer 130 are aligned on a substrate 140 toward the substrate 140. Thereafter, while a roller R moves on the stamp 120, the roller R presses the stamp 120 and the mask layer 130 to closely contact the mask layer 130 with a metal film 150. After a predetermined time has passed, while the stamp 120 is separated from the substrate 140, the mask layer 130 is transferred onto the metal film 150.

In a transfer process, heat may be applied to the mask layer 130, after pressing it by the roller R, and when separating the stamp 120 after a time passes, adherence of the mask layer 130 to the metal film 150 can be enhanced.

Figure 4:
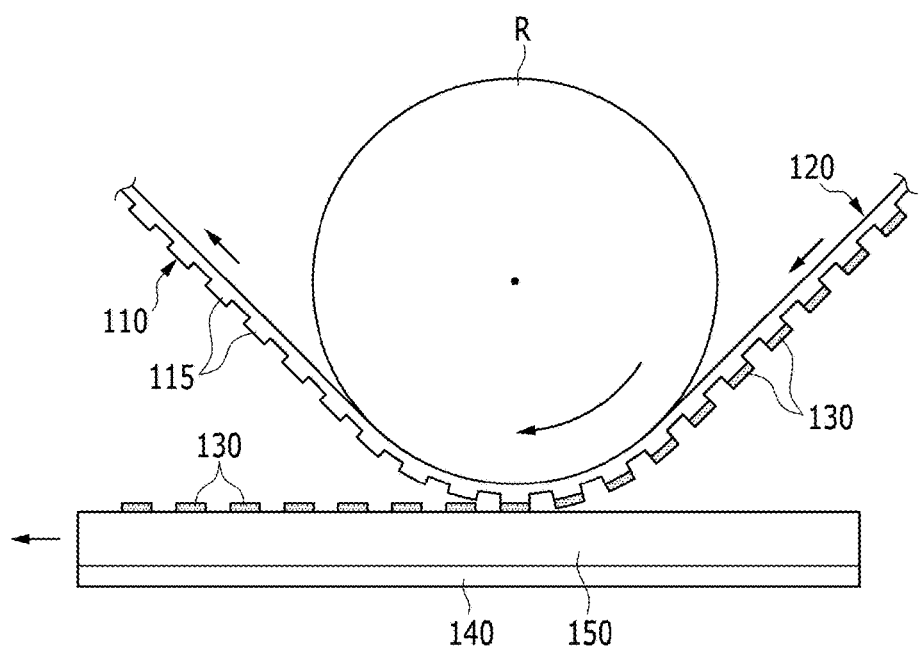
FIG. 4 is a cross-sectional view illustrating a second exemplary variation of the third step in the process flowchart of FIG. 1.

FIG. 4 is a cross-sectional view illustrating a second exemplary variation of the third step in the process flowchart of FIG. 1.

Referring to FIG. 4, a stamp 120 is made of a flexible material such as a polymer film, and a nanostructure body 110 and a mask layer 130 are loaded at a surface of a roller R toward the outside. The roller R that is wound with the stamp 120 rotates at a predetermined speed on the substrate 140, and when the mask layer 130 that is deposited in the stamp 120 passes through the lower end of the roller R, the mask layer 130 closely contacts the metal film 150 while being pressed by the roller R and is transferred onto the metal film 150.

As described above, when using the flexible stamp 120 and the roller R, the mask layer 130 can be quickly formed on the large substrate 140.

Figure 5A:
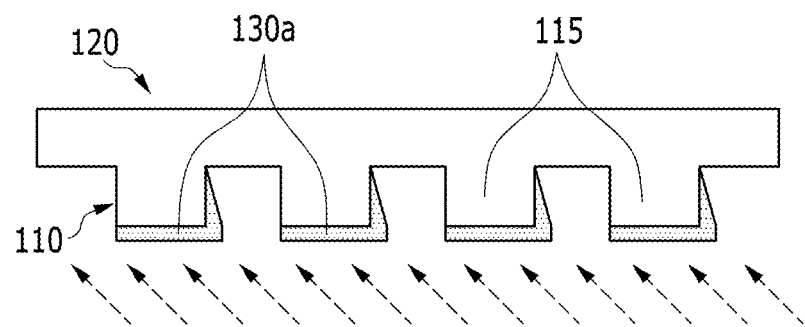
FIGS. 5A to 5C are cross-sectional views illustrating a method of manufacturing a wire grid polarizer according to a second exemplary embodiment of the present invention.
Figure 5B:
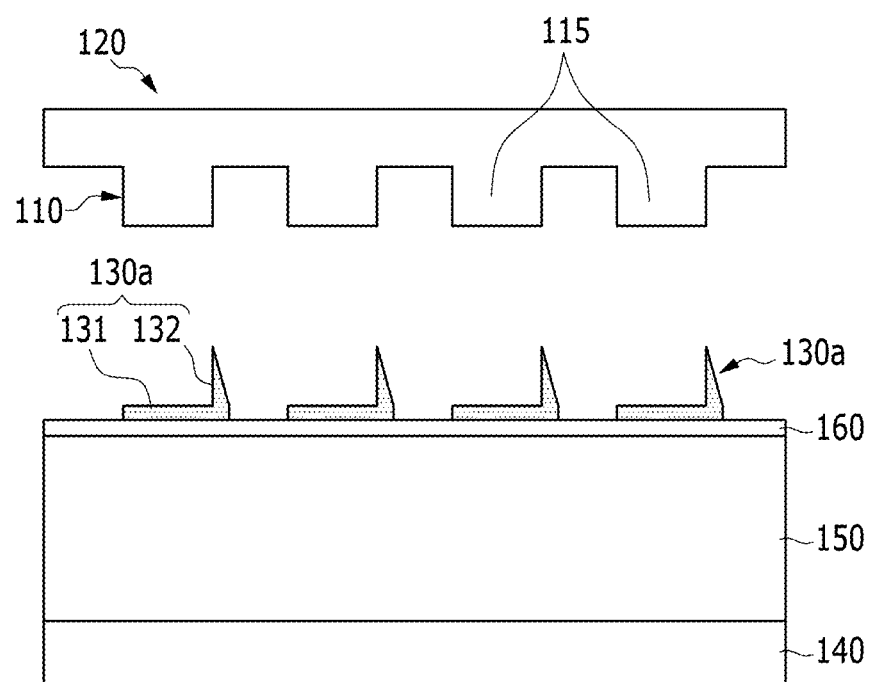
Figure 5C:
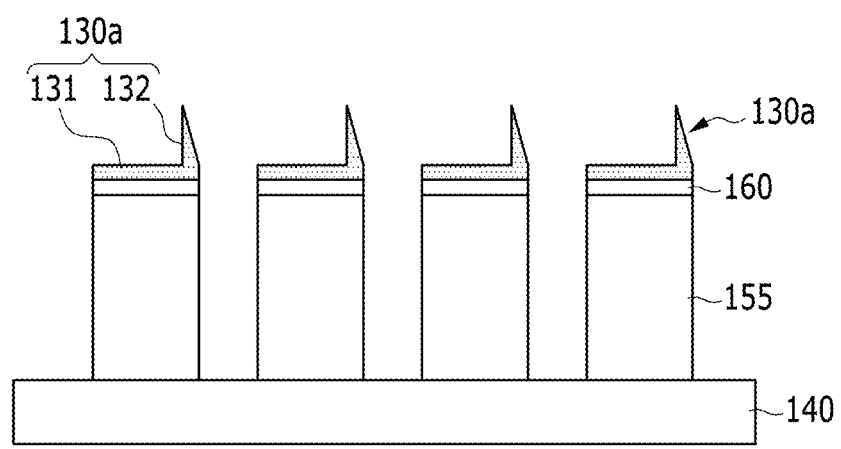

FIGS. 5A to 5C are cross-sectional views illustrating a method of manufacturing a wire grid polarizer according to a second exemplary embodiment of the present invention.

Referring to FIG. 5A, in the first step (S10), at one surface of a stamp 120 in which a nanostructure body 110 is formed, a mask layer 130a is formed with anisotropic vapor deposition, and in this case, by applying a method of tilting the stamp 120, a material of the mask layer 130 is angularly deposited. Accordingly, the mask layer 130a is formed at an upper surface of a protruding portion 115 and one side surface of the protruding portion 115. In this case, angular deposition means that a deposition direction does not correspond with a thickness direction (vertical direction of FIG. 5A) of the stamp 120 and has a predetermined tilt angle.

When a deposition direction of the mask layer 130a corresponds with a thickness direction of the stamp 120, even at a side surface of a protruding portion, a small amount of mask layer material may be deposited. When thickly forming the mask layer 130a, if a deposition direction of the mask layer 130a corresponds with a thickness direction of the stamp 120, the mask layer 130a may be formed in the entirely of an upper surface of a protruding portion, both side surfaces of a protruding portion, and a concave surface between protruding portions.

That is, the mask layer 130a may be formed at the entirety of one surface of a stamp 120 in which the nanostructure body 110 is formed. In this case, when the mask layer 130a is transferred onto a metal layer, not only is a mask layer of an upper surface of a protruding portion transferred, but an entire mask layer of one surface of the stamp 120 may be transferred onto the metal layer.

When thickly forming the mask layer 130a, the mask layer 130a may be angularly deposited, as shown in FIG. 5A. Accordingly, because the mask layer 130a is formed at an upper surface of the protruding portion 115 and one side surface of the protruding portion 115, a plurality of mask layers 130a can be separately formed. That is, when angular deposition is applied, a mask layer can be prevented from being formed at the entire surface of the stamp 120.

Referring to FIGS. 5B and 5C, the second step (S20), the third step (S30), and the fourth step (S40) are the same as those of the foregoing first exemplary embodiment. However, the mask layer 130a that is transferred in the third step (S30) includes a flat portion 131 with a constant thickness and a wedge-shaped protrusion 132 that contacts one side edge of the flat portion 131. After the fourth step (S40), an adhesive layer 160 and the mask layer 130a may be removed, and when the adhesive layer 160 and the mask layer 130a are not removed but remain, the adhesive layer 160 and the mask layer 130a may constitute a wire grid polarizer together with the metal lines 155.

Figure 6A:
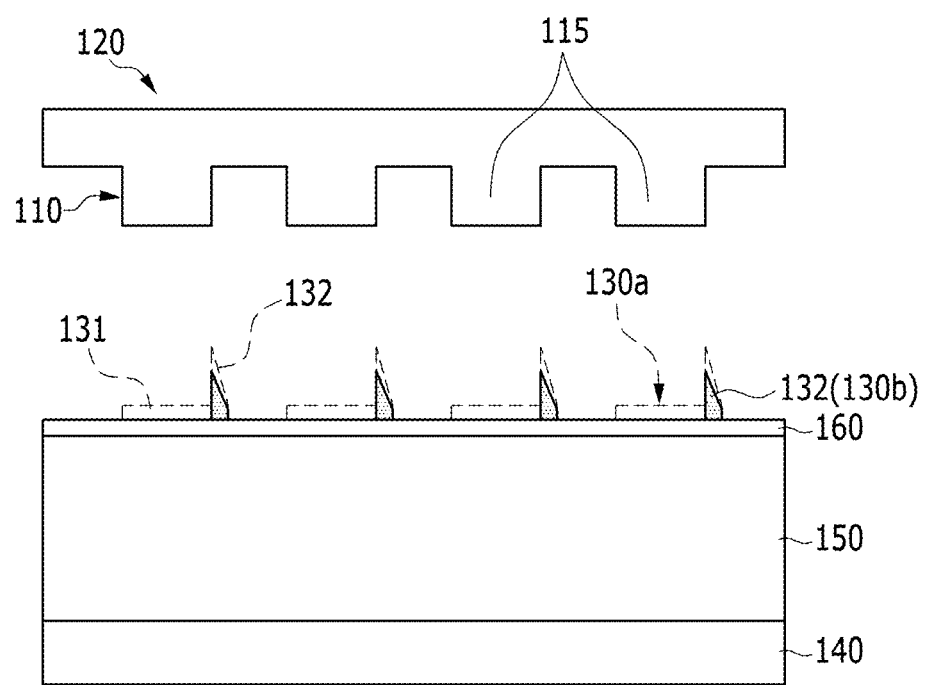
FIGS. 6A and 6B are cross-sectional views illustrating a method of manufacturing a wire grid polarizer according to a third exemplary embodiment of the present invention.
Figure 6B:
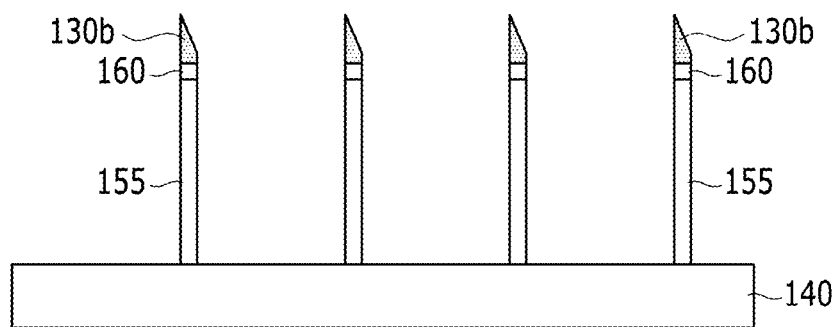

FIGS. 6A and 6B are cross-sectional views illustrating a method of manufacturing a wire grid polarizer according to a third exemplary embodiment of the present invention.

Referring to FIG. 6A, a first step (S10) and a second step (S20) are the same as those of the foregoing second exemplary embodiment, and in the third step (S30), a mask layer 130a that is transferred onto a metal film 150 includes a flat portion 131 with a constant thickness and a wedge-shaped protrusion 132 that contacts one side edge of the flat portion 131. Thereafter, the mask layer 130a is exposed to an etching gas to be etched until the flat portion 131 is entirely removed.

Because the protrusion 132 has a larger thickness than that of the flat portion 131, in an etching process of the mask layer 130a, even if the flat portion 131 is entirely removed, a portion of the protrusion 132 remains. Therefore, a final mask layer 130b has a upwardly pointed wedge shape and may have a very small width.

Referring to FIG. 6B, at a fourth step (S40), in the metal film 150, a portion that is not covered with the mask layer 130b is removed by an etching gas to be patterned into metal lines 155. After the fourth step (S40), an adhesive layer 160 and a mask layer 130b may be removed, and when the adhesive layer 160 and the mask layer 130b are not removed but remain, the adhesive layer 160 and the mask layer 130b may constitute a wire grid polarizer together with the metal lines 155.

The metal lines 155 that are completed with a method of the third exemplary embodiment have a much smaller line width than that of metal lines that are completed with a method of the first and second exemplary embodiments. According to a manufacturing method of the third exemplary embodiment, a width of the metal lines 155 can be effectively reduced and thus an aspect ratio of the metal lines 155 can be effectively enhanced.

Figure 7A:
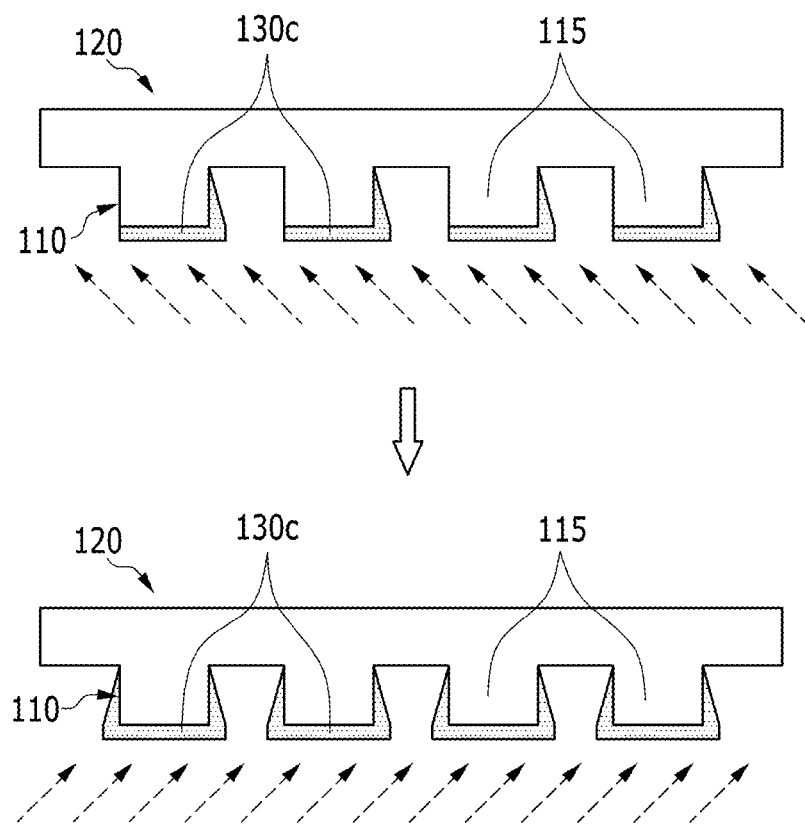
FIGS. 7A to 7C are cross-sectional views illustrating a method of manufacturing a wire grid polarizer according to a fourth exemplary embodiment of the present invention.
Figure 7B:
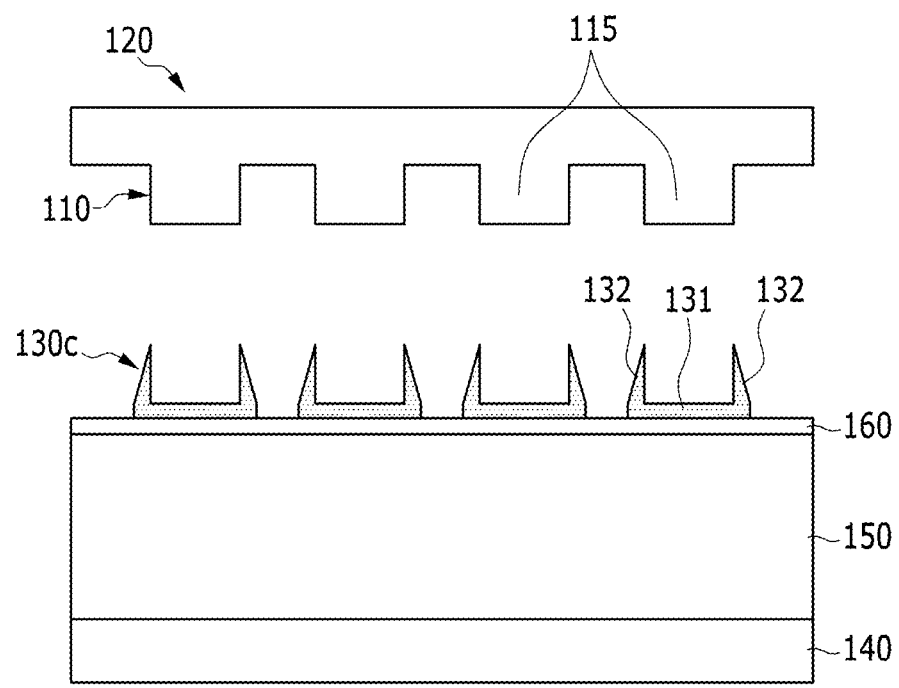
Figure 7C:
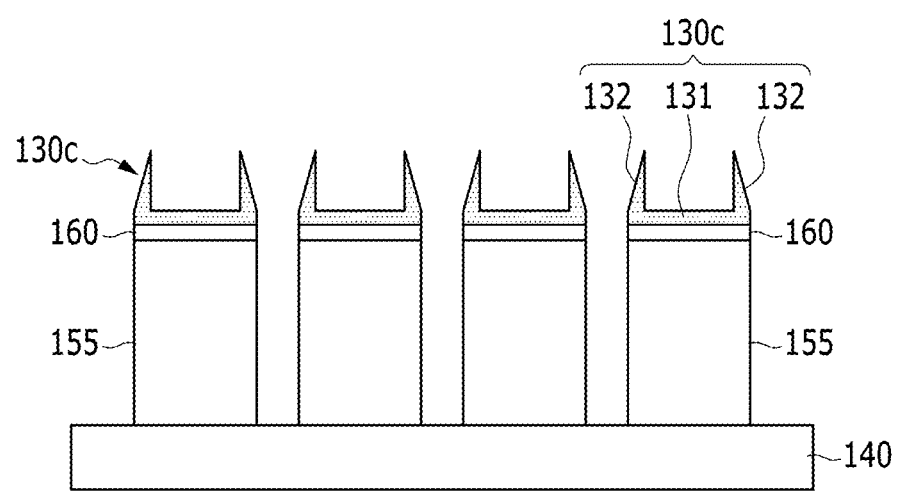

FIGS. 7A to 7C are cross-sectional views illustrating a method of manufacturing a wire grid polarizer according to a fourth exemplary embodiment of the present invention.

Referring to FIG. 7A, at a first step (S10), at one surface of a stamp 120 in which a nanostructure body 110 is formed, a mask layer 130c is formed with anisotropic vapor deposition. In this case, the first step (S10) includes a first angular deposition process and a second angular deposition process having different deposition directions. For example, by tilting the stamp 120 in one direction, the mask layer 130c may be angularly deposited, and by tilting the stamp 120 in an opposite direction, the mask layer 130c may be angularly deposited.

In the first angular deposition process, a material of the mask layer 130c is angularly deposited from one side (the right side of FIG. 7A) of the stamp 120. Accordingly, the mask layer 130c is formed at an upper surface of a protruding portion 115 and one side surface (the right side surface of FIG. 7A) of the protruding portion 115. In the second angular deposition process, a material of the mask layer 130c is angularly deposited from the other side (the left side of FIG. 7A) of the stamp 120. Accordingly, the mask layer 130c is formed at an upper surface of the protruding portion 115 and the other side surface (the left side surface of FIG. 7A) of the protruding portion 115.

Resultantly, the mask layer 130c is formed at an upper surface of the protruding portion 115 and both side surfaces of the protruding portion 115, and a mask layer is not formed at a concave surface between the protruding portions 115. When thickly forming the mask layer 130c, as shown in FIG. 7A, two angular depositions in opposite deposition directions may be performed. Therefore, by separately forming a plurality of mask layers 130c, a mask layer can be prevented from being formed at an entire one surface of the stamp 120.

Figure 7D:
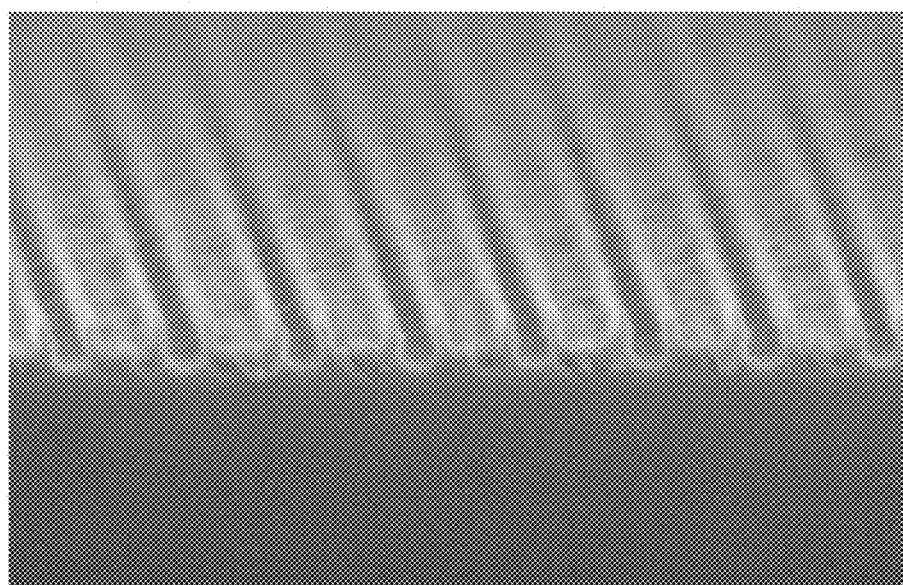
FIG. 7D is a microphotograph of a mask layer of FIG. 7B.

Referring to FIGS. 7B and 7C, the second step (S20), the third step (S30), and the fourth step (S40) are the same as those of the foregoing first exemplary embodiment. However, the mask layer 130c that is transferred in the third step (S30) includes a constant thickness of a flat portion 131 and a wedge-shaped protrusion 132 that contacts edges of both sides of the flat portion 131. After the fourth step (S40), an adhesive layer 160 and the mask layer 130c may be removed, and when the adhesive layer 160 and the mask layer 130c are not removed but remain, the adhesive layer 160 and the mask layer 130c may constitute a wire grid polarizer together with metal lines 155. FIG. 7D illustrates a microphotograph of the mask layer 130c that is transferred onto the metal film 150 in the third step (S30).

Figure 8A:
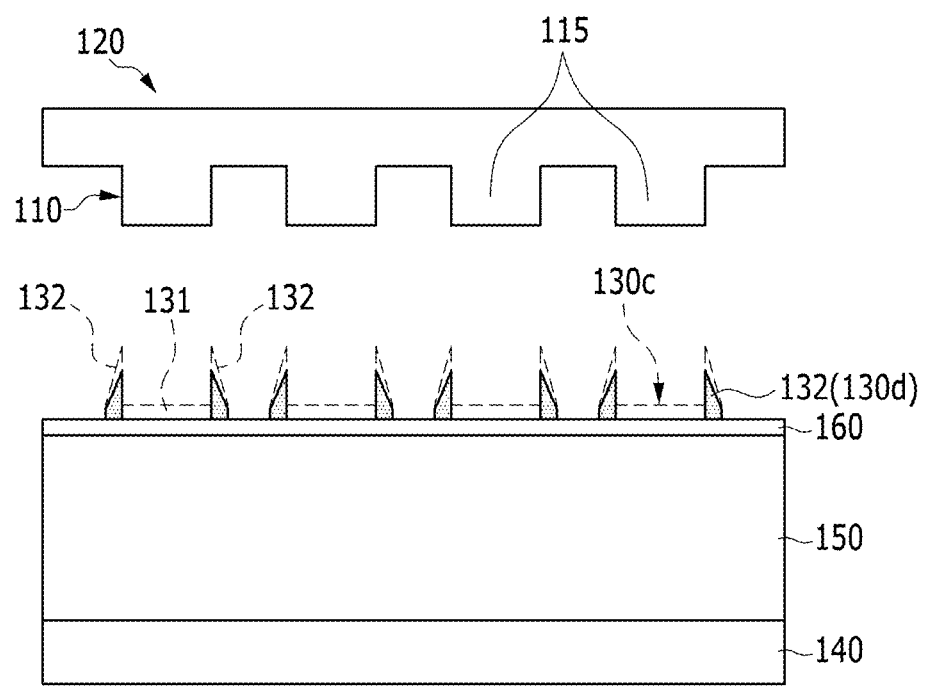
FIGS. 8A and 8B are cross-sectional views illustrating a method of manufacturing a wire grid polarizer according to a fifth exemplary embodiment of the present invention.
Figure 8B:
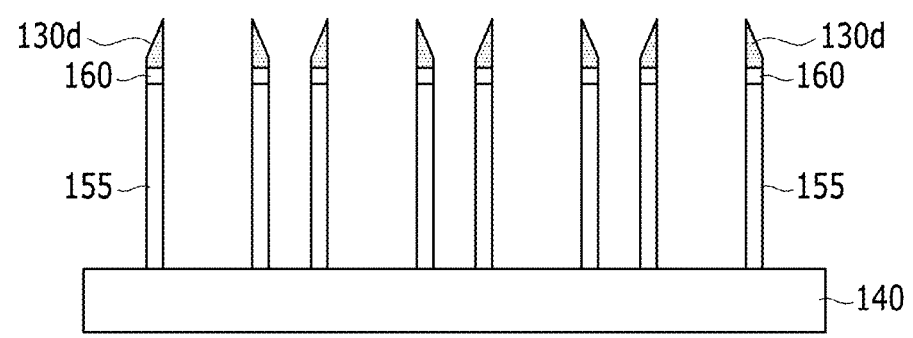

FIGS. 8A and 8B are cross-sectional views illustrating a method of manufacturing a wire grid polarizer according to a fifth exemplary embodiment of the present invention.

Referring to FIG. 8A, the first step (S10) and the second step (S20) are the same as those of the foregoing fourth exemplary embodiment, and in the third step (S30), a mask layer 130c that is transferred onto a metal film 150 includes a flat portion 131 with a constant thickness and a wedge-shaped protrusion 132 that contacts edges of both sides of the flat portion 131. Thereafter, the mask layer 130c is exposed to an etching gas thereof to be etched until the flat portion 131 is entirely removed.

Because the protrusion 132 has a larger thickness than that of the flat portion 131, in an etching process of the mask layer 130c, even if the flat portion 131 is entirely removed, a portion of the protrusion 132 remains. Therefore, a final mask layer 130d has an upwardly pointed wedge shape and may have a very small width. In this case, the number of final mask layers 130d is twice that of the number of transferred initial mask layers 130c.

Referring to FIG. 8B, in the fourth step (S40), a portion of the metal film 150 that is not covered with the mask layer 130d is removed by an etching gas to be patterned into metal lines 155. After the fourth step (S40), an adhesive layer 160 and the mask layer 130d may be removed, and when the adhesive layer 160 and the mask layer 130d are not removed but remain, the adhesive layer 160 and the mask layer 130d may constitute a wire grid polarizer together with the metal lines 155.

The metal lines 155 that are completed with a method of a fifth exemplary embodiment have a much smaller line width than that of metal lines that are completed with a method of the fourth exemplary embodiment, and have two times more metal lines that are completed with a method of the fourth exemplary embodiment. That is, a pitch of the metal lines 155 that are completed with a method of the fifth exemplary embodiment may be reduced by approximately two times than that of metal lines that are completed with a method of the fourth exemplary embodiment. According to a manufacturing method of the fifth exemplary embodiment, a width and pitch of the metal lines 155 can be effectively reduced and an aspect ratio of the metal lines 155 can be effectively enhanced.

Figure 9A:
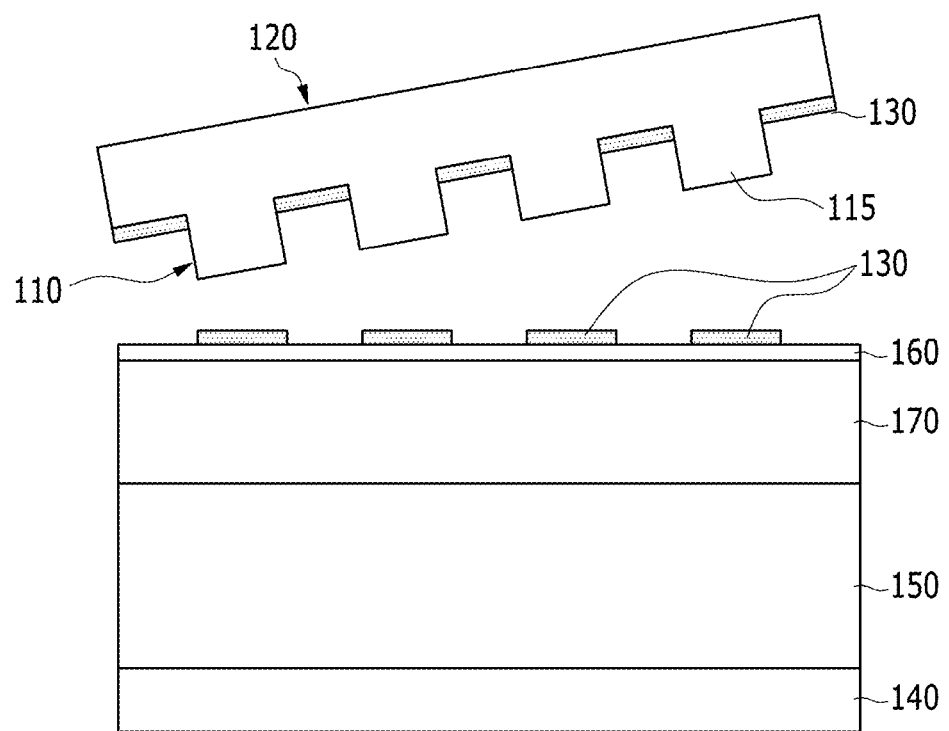
FIGS. 9A to 9C are cross-sectional views illustrating a method of manufacturing a wire grid polarizer according to a sixth exemplary embodiment of the present invention.
Figure 9B:
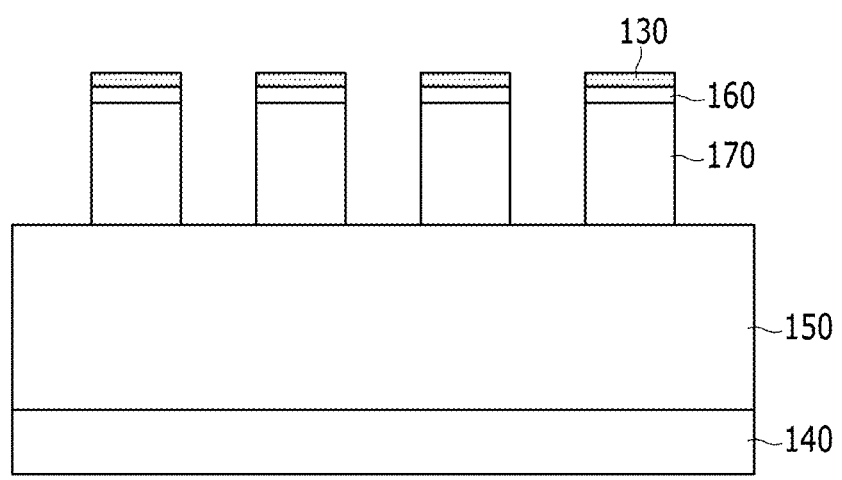
Figure 9C:
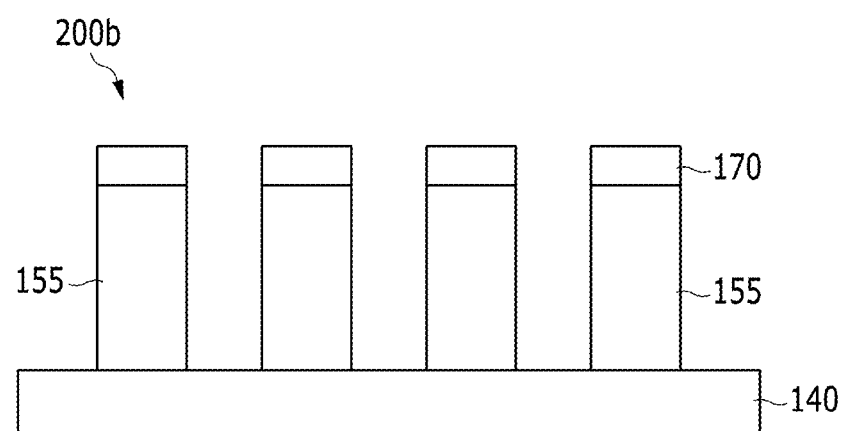

FIGS. 9A to 9C are cross-sectional views illustrating a method of manufacturing a wire grid polarizer according to a sixth exemplary embodiment of the present invention.

Referring to FIG. 9A, in the second step (S20) of forming a metal film 150 on a substrate 140, a hard mask layer 170 is further formed on the metal film 150. The hard mask layer 170 may be located between the metal film 150 and an adhesive layer 160.

The metal film 150 may include tungsten, titanium, or tungsten-titanium. In this case, when a mask layer 130 is made of an inorganic material such as a silicon oxide, a silicon nitride, or a polysilicon, the mask layer 130 may be etched by an etching gas of the metal film 150 at the fourth step (S40). That is, the foregoing inorganic materials exhibit high reactivity to an etching gas of the metal film 150.

The hard mask layer 170 is made of a material having low reactivity to an etching gas of the metal film 150, and may include a metal of a different kind from that of the metal film 150. Here, low reactivity means that an etching ratio of the hard mask layer 170 against the metal film 150 to an etching gas of the metal film 150 is 1 or less.

For example, when the metal film 150 includes tungsten, titanium, or tungsten-titanium, the hard mask layer 170 may include aluminum. As the hard mask layer 170 is located on the metal film 150, and the mask layer 130 may be made of a material having high etching reactivity to an etching gas of the metal film 150.

Referring to FIGS. 9B and 9C, the fourth step (S40) includes a first process (FIG. 9B) of dry etching the hard mask layer 170 using a first etching gas, and a second process (FIG. 9C) of dry etching the metal film 150 using a second etching gas.

In the first process, in the hard mask layer 170, a portion that is not covered with the mask layer 130 is removed by etching and is etched until a surface of the metal film 150 is exposed. In this case, an etching ratio of the mask layer 130 against the hard mask layer 170 to the first etching gas is 1 or less.

In the second process, in the metal film 150, a portion that is not covered with the hard mask layer 170 is removed by etching, and the metal film 150 is patterned into metal lines 155. In the second process, the mask layer 130 is removed by a second etching gas, but because the hard mask layer 170 remains on the metal film 150, the hard mask layer 170 operates as an etching mask.

In the second process, a portion of the hard mask layer 170 may be etched by a second etching gas, but until the metal lines 155 are etched to have an intended aspect ratio (e.g., until a surface of the substrate 140 is exposed), the hard mask layer 170 remains. For this reason, in consideration of an etching rate of the hard mask layer 170 and the metal film 150 to the second etching gas, the hard mask layer 170 may be formed in an appropriate thickness.

In a manufacturing method of a sixth exemplary embodiment, the first step and the third step are the same as those of the first exemplary embodiment and therefore a detailed description thereof will be omitted. A wire grid polarizer 200b that is completed with a method of the sixth exemplary embodiment includes a substrate 140, metal lines 155 that are formed on the substrate 140, and a hard mask layer 170 that is formed at an upper surface of the metal lines 155. Because the hard mask layer 170 is made of a metal, the hard mask layer 170 functions as a metal line of the wire grid polarizer 200b.

Therefore, in the wire grid polarizer 200b of the sixth exemplary embodiment, a metal line that actually performs a polarizing function is formed with a lower layer portion (original metal line) that is formed with a first metal and an upper layer portion (hard mask layer) that is formed with a second metal, and may have a higher aspect ratio than that of the metal line of the first exemplary embodiment due to such a second floor structure.

Figure 10A:
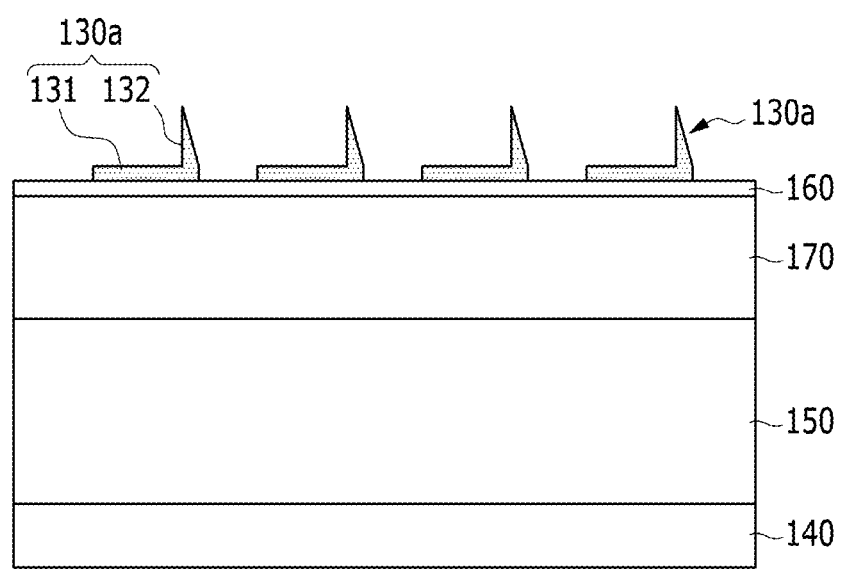
FIGS. 10A to 10C are cross-sectional views illustrating a method of manufacturing a wire grid polarizer according to a seventh exemplary embodiment of the present invention.
Figure 10B:
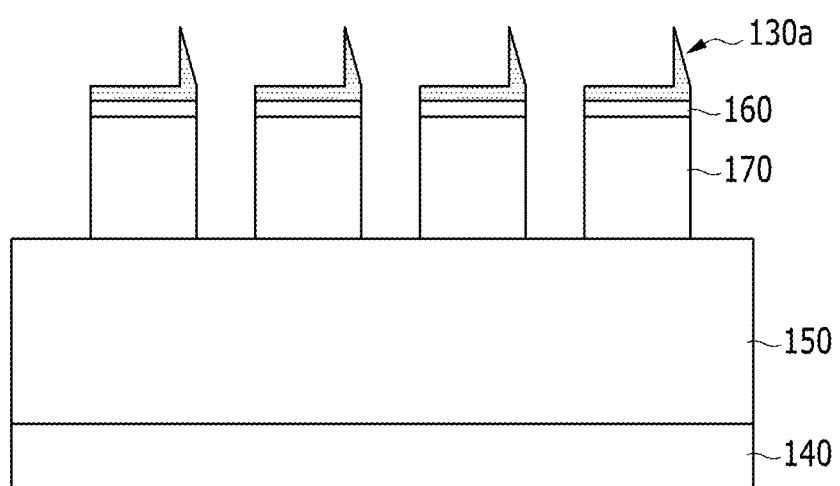
Figure 10C:
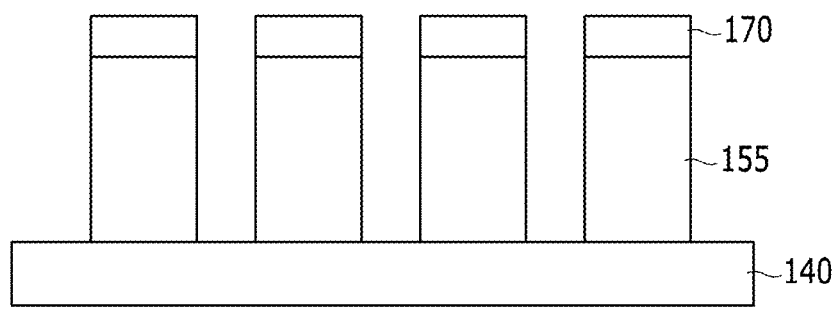

FIGS. 10A to 10C are cross-sectional views illustrating a method of manufacturing a wire grid polarizer according to a seventh exemplary embodiment of the present invention.

Referring to FIGS. 10A to 10C, at the first step (S10), a mask layer 130a is angularly deposited, and at the third step (S30), the mask layer 130a that is transferred onto a hard mask layer 170 includes a flat portion 131 with a constant thickness and a wedge-shaped protrusion 132 that contacts one side edge of the flat portion 131. In the first step (S10), an angular deposition method of the mask layer 130a is the same as that of the foregoing second exemplary embodiment, and the second step to the fourth step (S20), (S30), and (S40) are the same as those of the foregoing sixth exemplary embodiment and therefore a detailed description thereof will be omitted.

Figure 11A:
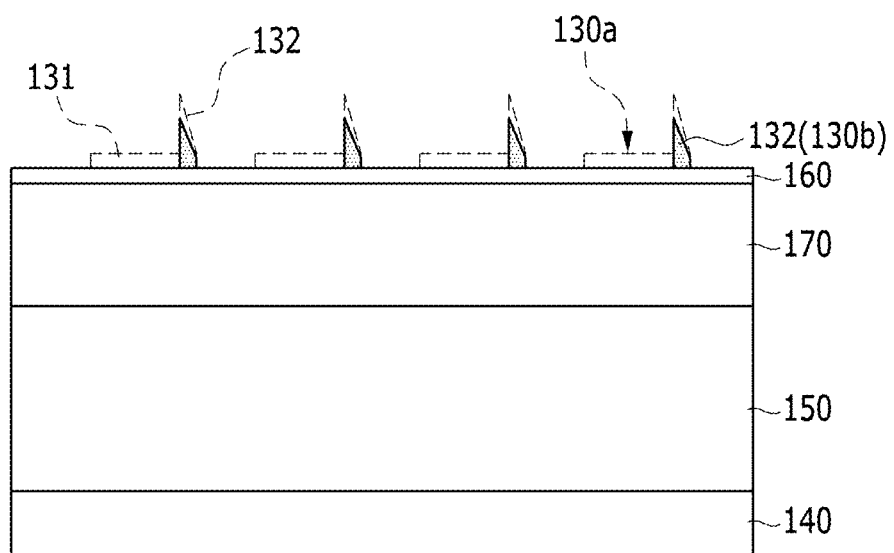
FIGS. 11A to 11C are cross-sectional views illustrating a method of manufacturing a wire grid polarizer according to an eighth exemplary embodiment of the present invention.
Figure 11B:
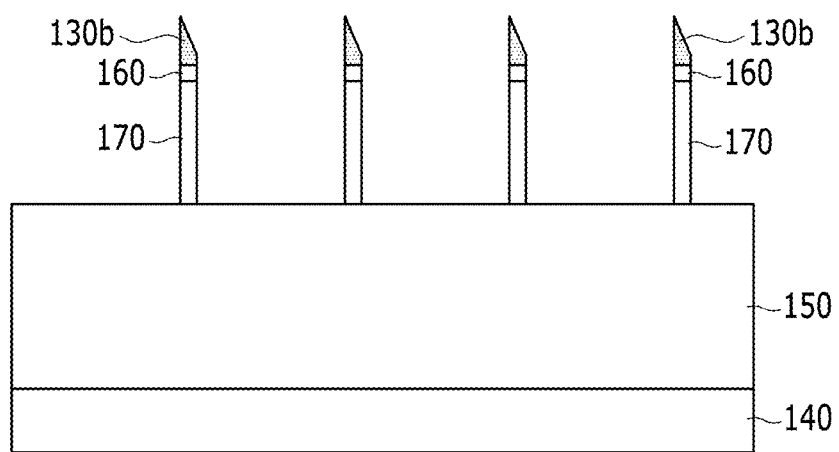
Figure 11C:
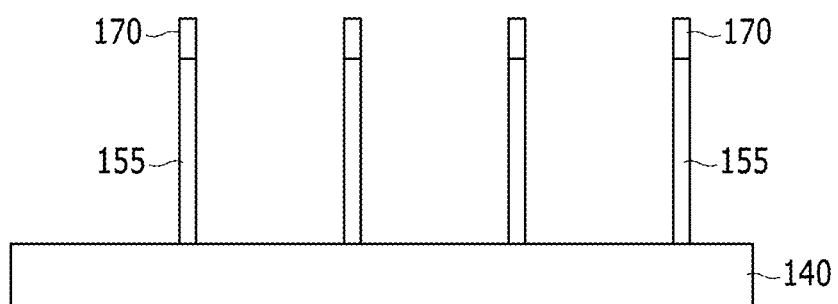

FIGS. 11A to 11C are cross-sectional views illustrating a method of manufacturing a wire grid polarizer according to an eighth exemplary embodiment of the present invention.

Referring to FIG. 11A, in the first step (S10), a mask layer 130a is angularly deposited, and in the third step (S30), the mask layer 130a that is transferred onto a hard mask layer 170 includes a flat portion 131 with a constant thickness and a wedge-shaped protrusion 132 that contacts one side edge of the flat portion 131. Thereafter, the mask layer 130a is exposed to an etching gas thereof to be etched until the flat portion 131 is entirely removed. A final mask layer 130b has an upwardly pointed wedge shape and may have a very small width.

Referring to FIGS. 11B and 11C, in the fourth step (S40), the hard mask layer 170 and a metal film 150 are patterned with the same width as that of the mask layer 130b. In a manufacturing method of the eighth exemplary embodiment, the remaining processes except for a process of removing the flat portion 131 of the mask layer 130a are the same as those of the foregoing seventh exemplary embodiment.

Figure 12A:
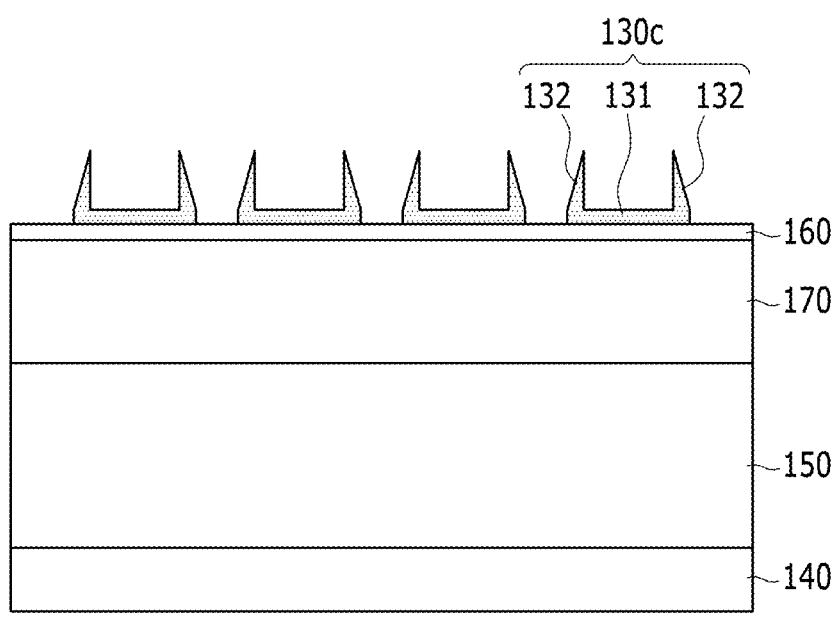
FIGS. 12A to 12C are cross-sectional views illustrating a method of manufacturing a wire grid polarizer according to a ninth exemplary embodiment of the present invention.
Figure 12B:
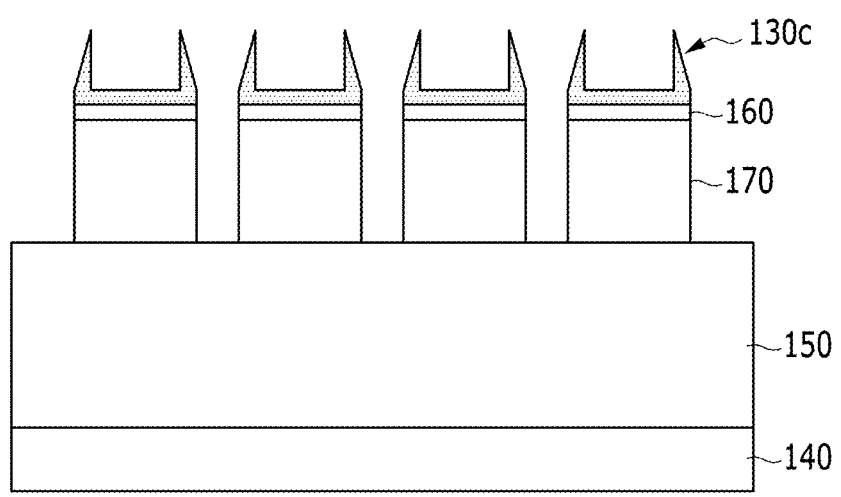
Figure 12C:
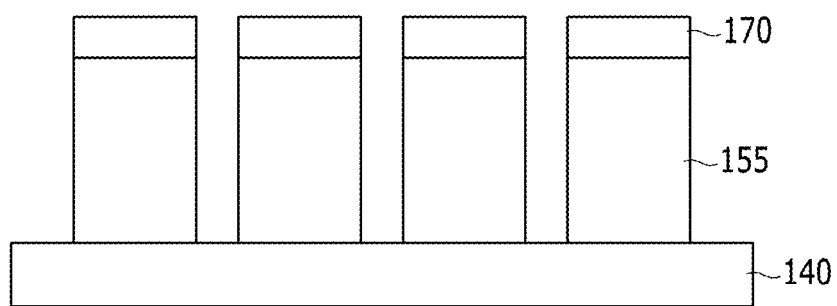

FIGS. 12A to 12C are cross-sectional views illustrating a method of manufacturing a wire grid polarizer according to a ninth exemplary embodiment of the present invention.

Referring to FIGS. 12A to 12C, in the first step (S10), a mask layer 130c is angularly deposited twice in opposite directions, and in the third step (S30), the mask layer 130c that is transferred onto a hard mask layer 170 includes a flat portion 131 with a constant thickness and a wedge-shaped protrusion 132 that contacts edges of both sides of the flat portion 131. In the first step (S10), an angular deposition method of the mask layer 130c is the same as that of the foregoing fourth exemplary embodiment, and the second step to the fourth step (S20), (S30), and (S40) are the same as those of the foregoing sixth exemplary embodiment and therefore a detailed description thereof will be omitted.

Figure 13A:
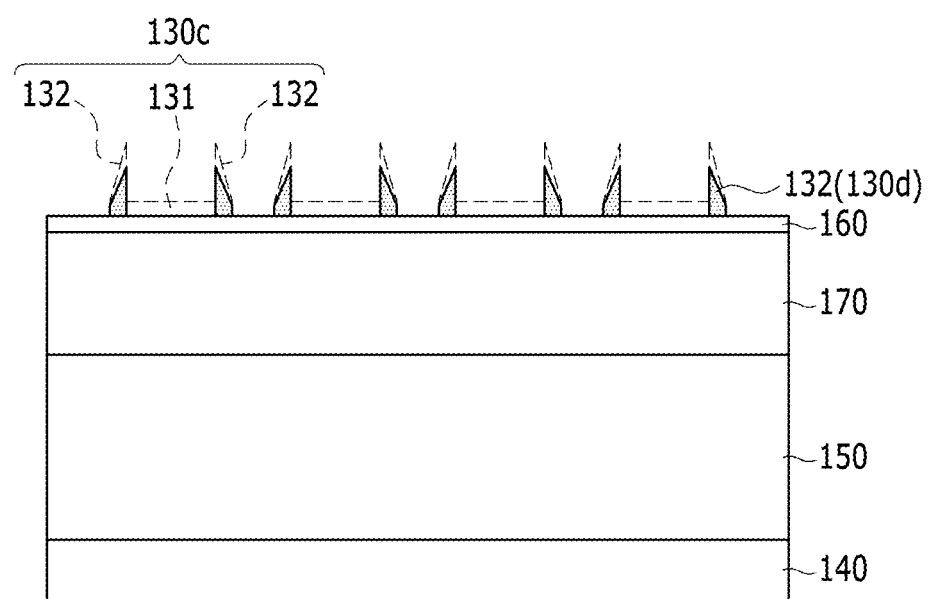
FIGS. 13A to 13C are cross-sectional views illustrating a method of manufacturing a wire grid polarizer according to a tenth exemplary embodiment of the present invention.
Figure 13B:
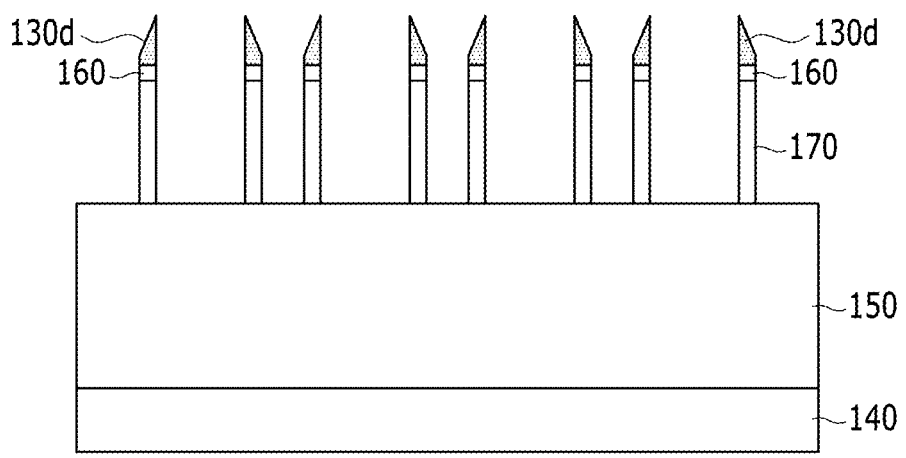
Figure 13C:
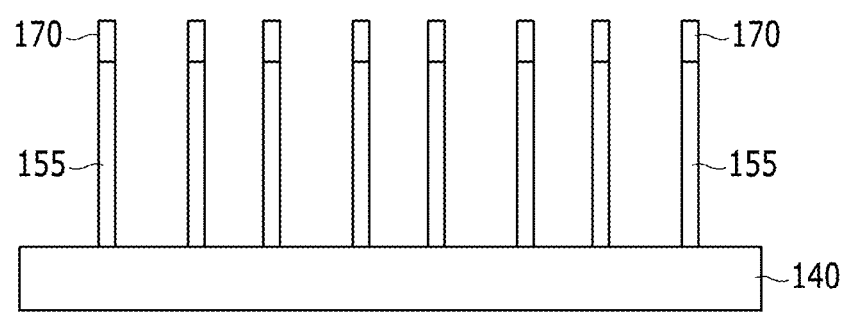

FIGS. 13A to 13C are cross-sectional views illustrating a method of manufacturing a wire grid polarizer according to a tenth exemplary embodiment of the present invention.

Referring to FIG. 13A, in the first step (S10), a mask layer 130c is angularly deposited twice in opposite directions, and in the third step (S30), the mask layer 130c that is transferred onto a hard mask layer 170 includes a flat portion 131 with a constant thickness and a wedge-shaped protrusion 132 that contacts edges of both sides of the flat portion 131. Thereafter, the mask layer 130c is exposed to an etching gas thereof to be etched until the flat portion 131 is entirely removed. A final mask layer 130d has an upwardly pointed wedge shape and may have a very small width.

Referring to FIGS. 13B and 13C, in the fourth step (S40), the hard mask layer 170 and the metal film 150 are patterned with the same width as that of the mask layer 130d. In a manufacturing method of a tenth exemplary embodiment, the remaining processes except for a process of removing the flat portion 131 of the mask layer 130c are the same as those of the foregoing ninth exemplary embodiment. According to a manufacturing method of the tenth exemplary embodiment, a width and pitch of metal lines 155 can be effectively reduced, and an aspect ratio of the metal lines 155 can be effectively enhanced.

The stamp 120 that is used in the foregoing second exemplary embodiment to tenth exemplary embodiment may be a hard stamp or a flexible stamp, and when the stamp 120 is a flexible stamp, the stamp 120 may transfer mask layers 130, 130a, and 130c onto the metal film 150 or the hard mask layer 170 using a roller.

FIGS. 14A to 14D are cross-sectional views illustrating a method of manufacturing a wire grid polarizer according to an eleventh exemplary embodiment of the present invention.

Figure 14A:
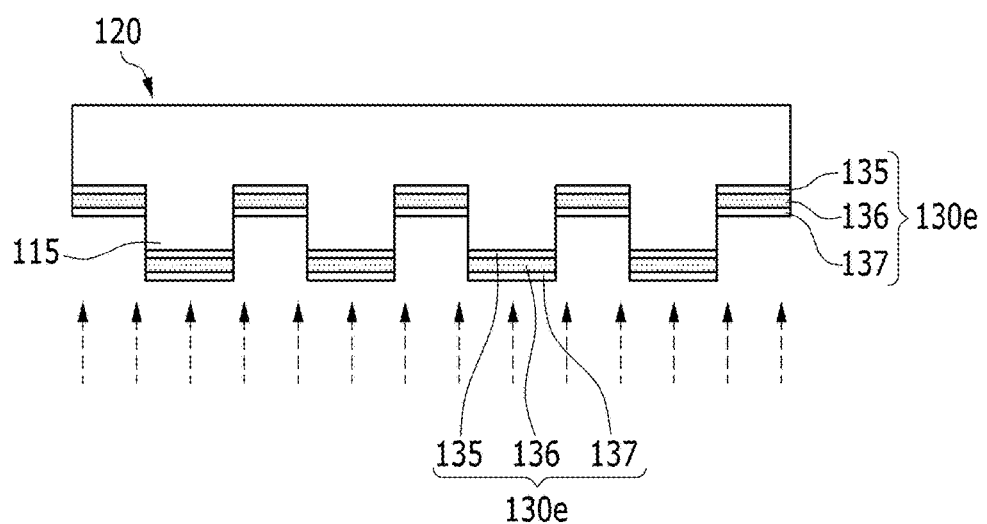
FIGS. 14A to 14D are cross-sectional views illustrating a method of manufacturing a wire grid polarizer according to an eleventh exemplary embodiment of the present invention.

Referring to FIG. 14A, in the first step (S10), a mask layer 130e that is formed at one surface of the stamp 120 is formed with a multilayer of different kinds of materials.

Specifically, the mask layer 130e includes a mold release layer 135 that contacts a surface of the stamp 120, a mask material layer 136 that is formed on the mold release layer 135 and that substantially functions as an etching mask, and a bond reinforcing layer 137 that is formed on the mask material layer 136. All of the mold release layer 135, the mask material layer 136, and the bond reinforcing layer 137 are formed with anisotropic vapor deposition.

In the third step (S30), when transferring a mask layer 130e onto a metal film 150, the mold release layer 135 performs a function of enhancing mold release (separation) performance of the mask layer 130e to the stamp 120. The mold release layer 135 may be made of a metal such as aluminum, or the mask material layer 136 may be made of an inorganic material or a metal of a different kind from that of the mold release layer 135.

The bond reinforcing layer 137 performs a function of enhancing adherence of the mask material layer 136 to the metal film 150. The bond reinforcing layer 137 may be made of the same metal as that of the metal film 150 on a substrate 140, or may be made of a metal that is excellent in adherence with the metal film 150 among different kinds of metals from that of the metal film 150.

Figure 14B:
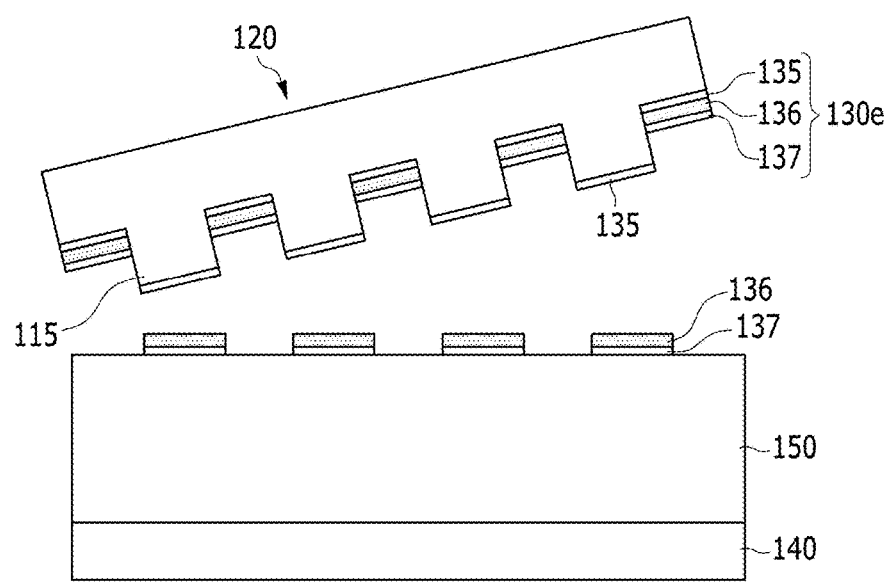
Figure 14C:
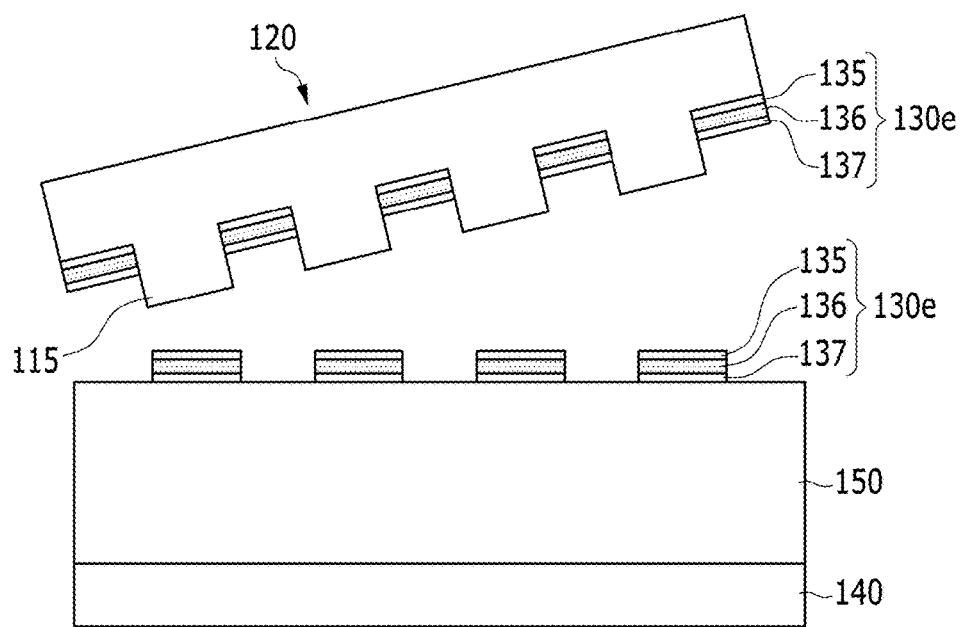

Referring to FIGS. 14B and 14C, in the third step (S30), the mask layer 130e is transferred onto the metal film 150. In this case, the mold release layer 135 may not be transferred but remains on a protruding portions 115 of the stamp 120 (FIG. 14B), or may be transferred onto the metal film 150 together with the mask material layer 136 and the bond reinforcing layer 137 (FIG. 14C). In two cases, the mask material layer 136 is securely fixed on the metal film 150 by the bond reinforcing layer 137.

In this case, when the bond reinforcing layer 137 is made of the same metal as that of the metal film 150, room temperature bonding of the metal film 150 and the mask layer 130e is available. Therefore, in a transfer process, a temperature rising process for enhancing bonding power of the mask layer 130e may be omitted.

Figure 14D:
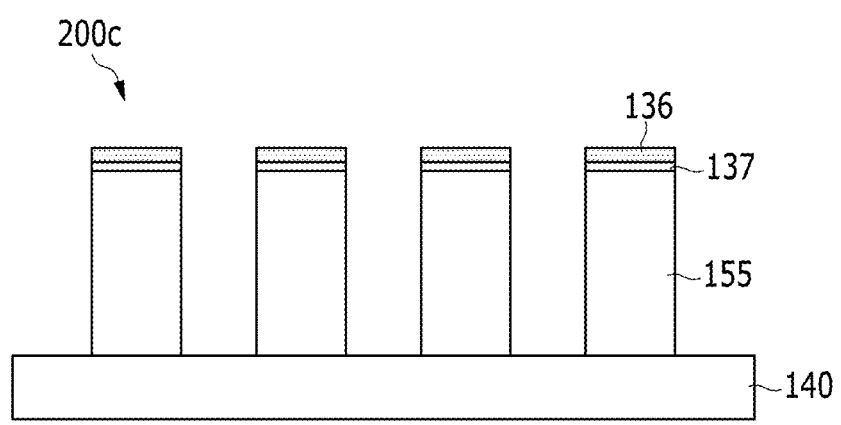

Referring to FIG. 14D, in the fourth step (S40), in the metal film 150, a portion that is not covered with the mask material layer 136 is removed by an etching gas, and the metal film 150 is patterned into metal lines 155 having a high aspect ratio. The mask material layer 136 of an upper portion of the metal lines 155 may be removed, or when the mask material layer 136 of an upper portion of the metal lines 155 is not removed but remains, the mask material layer 136 may constitute a wire grid polarizer 200c together with the metal lines 155.

In this way, in a manufacturing method of an eleventh exemplary embodiment, the mask layer 130e is formed with a multilayer including various function layers. In this case, function layers includes a mold release layer 135 that enhances mold release performance of the mask material layer 136 and a bond reinforcing layer 137 that enhances adherence of the mask material layer 136 to the metal film 150.

In a manufacturing method of the eleventh exemplary embodiment, mold release (separation) of the mask material layer 136 from the stamp 120 can be smoothly performed using the mold release layer 135, and thus transfer quality of the mask material layer 136 can be enhanced. Further, by enhancing adherence of the mask material layer 136 to the metal film 150 using the bond reinforcing layer 137, in a production process, separation or peeling off of the mask material layer 136 is prevented and thus patterning quality of the metal lines 155 can be enhanced.

In a manufacturing method of an eleventh exemplary embodiment, the second step (S20), the third step (S30), and the fourth step (S40) are the same as those of any one of the foregoing first exemplary embodiment to tenth exemplary embodiment. Further, the stamp 120 that is used in the eleventh exemplary embodiment may be a hard stamp or a flexible stamp, and when the stamp 120 is a flexible stamp, in the transfer step, the stamp 120 may use a roller.

Figure 15A:
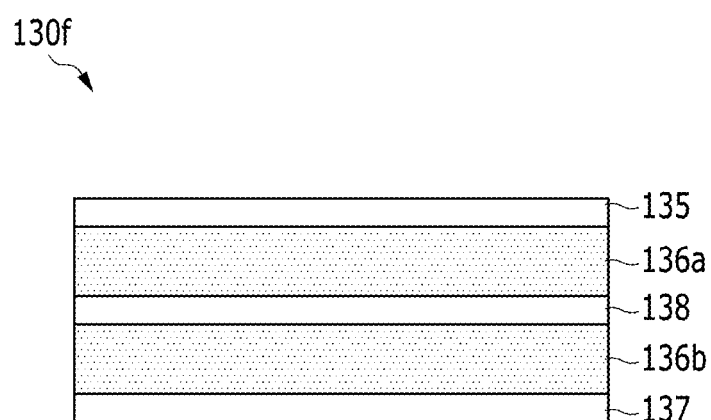
FIG. 15A is a cross-sectional view illustrating a first exemplary variation of a mask layer of FIG. 14A.

FIG. 15A is a cross-sectional view illustrating a first exemplary variation of a mask layer of FIG. 14A.

Referring to FIG. 15A, a mask layer 130f includes a mold release layer 135 that contacts a surface of a stamp, a first mask material layer 136a that is formed on the mold release layer 135, a flexible layer 138 that is formed on the first mask material layer 136a, a second mask material layer 136b that is formed on the flexible layer 138, and a bond reinforcing layer 137 that is formed on the second mask material layer 136b.

All of the mold release layer 135, the first mask material layer 136a, the flexible layer 138, the second mask material layer 136b, and the bond reinforcing layer 137 are formed with anisotropic vapor deposition.

The first and second mask material layers 136a and 136b substantially function as a etching mask, and may be made of an inorganic material or a metal of a different kind from that of the mold release layer 135. By enhancing flexibility of the entire mask layer 130f, the flexible layer 138 enables large area patterning. For example, the flexible layer 138 may be made of a metal having excellent flexibility, such as aluminum.

A mask layer including an inorganic material does not have high flexibility, and the mask material layers 136a and 136b are separated into two, and as the flexible layer 138 is located between the mask material layers 136a and 136b that are separated into two, the mask layer 130f of a first exemplary variation has entirely improved flexibility. Therefore, the mask layer 130f may be very advantageously applied to a flexible stamp, and by forming a substrate and a stamp in a large size, large area patterning can be realized.

Figure 15B:
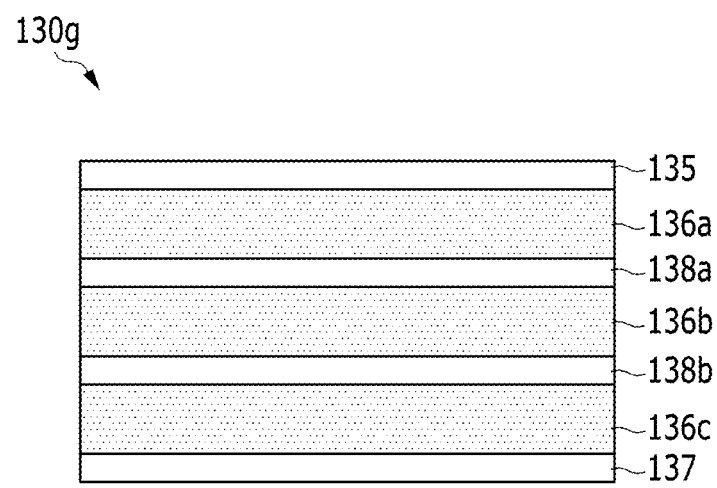
FIG. 15B is a cross-sectional view illustrating a second exemplary variation of a mask layer of FIG. 14A.

FIG. 15B is a cross-sectional view illustrating a second exemplary variation of a mask layer of FIG. 14A.

Referring to FIG. 15B, a mask layer 130g includes a mold release layer 135 that contacts a surface of a stamp 120, and a first mask material layer 136a, a first flexible layer 138a, a second mask material layer 136b, a second flexible layer 138b, a third mask material layer 136c, and a bond reinforcing layer 137 that are sequentially layered on the mold release layer 135.

All of the mold release layer 135, the first mask material layer 136a, the first flexible layer 138a, the second mask material layer 136b, the second flexible layer 138b, the third mask material layer 136c, and the bond reinforcing layer 137 are formed with anisotropic vapor deposition.

The first to third mask material layers 136a, 136b, and 136c substantially function as a etching mask, and may be made of an inorganic material or a metal of a different kind from that of the mold release layer 135. By enhancing flexibility of the entire mask layer 130g, the first and second flexible layers 138a and 138b enable large area patterning. For example, the first and second flexible layers 138a and 138b may be made of a metal having excellent flexibility, such as aluminum.

The mask layer 130g of a second exemplary variation has entirely improved flexibility, and thus the mask layer 130g may be very advantageously applied to a flexible stamp, and by forming a substrate and a stamp in a large size, large area patterning can be realized. In the foregoing mask layers 130f and 130g, the number of mask material layers and flexible layers is not limited to examples of FIGS. 15A and 15B.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

110: nanostructure body
115: protruding portion
120: stamp
130, 130a, 130b: 130c, 130d, 130e, 130f, 130g: mask layer
131: flat portion
132: protrusion
135: mold release layer
137: bond reinforcing layer
136: mask material layer
138: flexible layer
140: substrate
150: metal film
155: metal line
200, 200a, 200b, 200c: wire grid polarizer

What is claimed is:

1. A method of manufacturing a wire grid polarizer, the method comprising:
preparing a stamp having a nanostructure body at one surface and forming a mask layer with anisotropic vapor deposition at the one surface;
forming a metal film on a substrate;
transferring the mask layer onto the metal film; and
patterning the metal film into metal lines by removing a portion that is not covered with the mask layer in the metal film with dry etching,
wherein the nanostructure body comprises a plurality of protruding portions,
the forming of a mask layer with anisotropic vapor deposition comprises forming a mask layer at an upper surface and one side surface of each of the plurality of protruding portions by performing anisotropic vapor deposition in a direction that is inclined in a thickness direction of the stamp, and
the mask layer that is transferred onto the metal film comprises a flat portion with a constant thickness and a protrusion that contacts one side edge of the flat portion.

2. The method of claim 1, wherein the mask layer is angularly deposited in two different directions to be formed at an upper surface and both side surfaces of each of the plurality of protruding portions, and
the mask layer that is transferred onto the metal film further comprises a protrusion that contacts the other side edge of the flat portion.

3. The method of claim 1, wherein the mask layer that is transferred onto the metal film is exposed to an etching gas to be etched until the flat portion is entirely removed, and
a portion of the protrusion remains to constitute a final mask layer.

4. The method of claim 1, wherein the mask layer comprises an inorganic material or a metal of a different kind from that of the metal film, and
an etching ratio of the mask layer against the metal film to an etching gas of the metal film is 1 or less.

5. The method of claim 1, wherein the mask layer is formed with a single film of any one of a silicon oxide, a silicon nitride, a polysilicon, an aluminum oxide, aluminum, copper, gold, tungsten, titanium, and titanium-tungsten, or a stacked layer thereof.

6. The method of claim 1, wherein an adhesive layer comprising a bond primer is formed on the metal film, and
the mask layer is transferred onto the adhesive layer.

7. The method of claim 1, wherein the mask layer is formed in a multilayer structure having at least one mask material layer and at least two function layers, and
the function layer comprises a mold release layer that contacts a surface of the stamp and a bond reinforcing layer that is formed on the mask material layer.

8. The method of claim 1, wherein the stamp is made of a flexible material, the mask layer is aligned on the substrate toward the substrate, and the mask layer is pressed by a roller to be separated from the substrate.

9. A method of manufacturing a wire grid polarizer, the method comprising:
preparing a stamp having a nanostructure body at one surface and forming a mask layer with anisotropic vapor deposition at the one surface;
forming a metal film on a substrate;
forming a hard mask layer on the metal film;
forming an adhesive layer on the hard mask layer;
transferring the mask layer onto the adhesive layer; and
patterning the metal film into double-layered metal lines by removing a portion that is not covered with the mask layer in the metal film with drying etching,
wherein the hard mask layer comprises a metal of a different kind from that of the metal film,
the patterning of the metal film into double-layered metal lines comprises a first process of dry etching the hard mask layer using a first etching gas and a second process of dry etching the metal film using a second etching gas, and
an etching ratio of the hard mask layer against the metal film to the second etching gas is 1 or less.

10. The method of claim 9, wherein the mask layer comprises an inorganic material or a metal of a different kind from that of the hard mask layer, and
an etching ratio of the mask layer against the hard mask layer to the first etching gas is 1 or less.

11. The method of claim 9, wherein in the second process, all of the mask layer and a portion of the hard mask layer are removed by etching.

12. The method of claim 9, wherein the adhesive layer comprises a bond primer.

13. A method of manufacturing a wire grid polarizer, the method comprising:
- preparing a stamp having a nanostructure body at one surface and forming a mask layer with anisotropic vapor deposition at the one surface;
- forming a metal film on a substrate;
- transferring the mask layer onto the metal film; and
- patterning the metal film into metal lines by removing a portion that is not covered with the mask layer in the metal film with dry etching,
- wherein the mask layer is formed in a multilayer structure having at least one mask material layer and at least two function layers,
- the function layer comprises a mold release layer that contacts a surface of the stamp and a bond reinforcing layer that is formed on the mask material layer, and
- wherein the mold release layer comprises a metal,
- the mask material layer comprises an inorganic material or a metal of a different kind from that of the mold release layer and the metal film, and
- the bond reinforcing layer comprises a metal of the same kind as that of the metal film.

14. A method of manufacturing a wire grid polarizer, the method comprising:
- preparing a stamp having a nanostructure body at one surface and forming a mask layer with anisotropic vapor deposition at the one surface;
- forming a metal film on a substrate;
- transferring the mask layer onto the metal film; and
- patterning the metal film into metal lines by removing a portion that is not covered with the mask layer in the metal film with dry etching,
- wherein the mask layer is formed in a multilayer structure having at least one mask material layer and at least two function layers,
- the function layer comprises a mold release layer that contacts a surface of the stamp and a bond reinforcing layer that is formed on the mask material layer, and
- wherein the mask material layer is separated into at least two layers, and
- the function layer is formed in each layer between the at least two separated layers to comprise at least one flexible layer that enhances flexibility of the entire mask layer.

* * * * *